United States Patent
Lim et al.

(10) Patent No.: US 11,048,645 B2
(45) Date of Patent: Jun. 29, 2021

(54) MEMORY MODULE, OPERATION METHOD THEROF, AND OPERATION METHOD OF HOST

(71) Applicant: Samsung Electronics Co., Ltd., Suwon-si (KR)

(72) Inventors: Sun-Young Lim, Hwaseong-si (KR); Dimin Niu, Sunnyvale, CA (US); Jae-Gon Lee, Seoul (KR)

(73) Assignee: Samsung Electronics Co., Ltd.

(*) Notice: Subject to any disclaimer, the term of this patent is extended or adjusted under 35 U.S.C. 154(b) by 69 days.

(21) Appl. No.: 16/103,058

(22) Filed: Aug. 14, 2018

(65) Prior Publication Data

US 2019/0236030 A1 Aug. 1, 2019

Related U.S. Application Data

(60) Provisional application No. 62/625,044, filed on Feb. 1, 2018.

(30) Foreign Application Priority Data

Feb. 19, 2018 (KR) .................. 10-2018-0019329

(51) Int. Cl.
*G06F 3/06* (2006.01)
*G06F 12/14* (2006.01)
(Continued)

(52) U.S. Cl.
CPC ........ *G06F 12/1433* (2013.01); *G06F 3/0622* (2013.01); *G06F 3/0679* (2013.01); *G06F 21/79* (2013.01)

(58) Field of Classification Search
CPC .... G06F 12/1433; G06F 3/0622; G06F 21/79; G06F 3/0679; G06F 3/0613; G06F 3/0656; G06F 3/0611; G06F 3/0659; G06F 2212/1024; G06F 12/0246; G06F 2212/7203

See application file for complete search history.

(56) References Cited

U.S. PATENT DOCUMENTS

| 6,956,776 B1* | 10/2005 | Lowe ................... G06F 5/14 365/189.05 |
| 7,373,467 B2 | 5/2008 | Hughes |

(Continued)

FOREIGN PATENT DOCUMENTS

KR 1020170104117 A 9/2017

*Primary Examiner* — Charles Rones
*Assistant Examiner* — Tong B. Vo
(74) *Attorney, Agent, or Firm* — Myers Bigel, P.A.

(57) ABSTRACT

A memory module includes a random access memory (RAM) device that includes a first storage region and a second storage region, a nonvolatile memory device, and a controller that controls the RAM device or the nonvolatile memory device under control of a host. The controller includes a data buffer that temporarily stores first data received from the host, and a buffer returning unit that transmits first release information to the host when the first data are moved from the data buffer to the first storage region or the second storage region of the RAM device and transmits second release information to the host when the first data are moved from the second storage region to the nonvolatile memory device.

14 Claims, 29 Drawing Sheets

(51) Int. Cl.
*G06F 21/79* (2013.01)
*G06F 16/11* (2019.01)
*G06F 16/174* (2019.01)
*G11C 16/26* (2006.01)
*G11C 29/52* (2006.01)
*G11C 16/04* (2006.01)
*G11C 16/10* (2006.01)
*G06F 11/10* (2006.01)

(56) References Cited

U.S. PATENT DOCUMENTS

| | | | |
|---|---|---|---|
| 7,433,245 | B2 | 10/2008 | Otsuka et al. |
| 7,712,006 | B1 | 5/2010 | Miller |
| 7,911,952 | B1 | 3/2011 | Nygreen et al. |
| 9,477,631 | B2 | 10/2016 | Debbage et al. |
| 2013/0080679 | A1 | 3/2013 | Bert |
| 2014/0372667 | A1* | 12/2014 | Tan ............... G06F 12/0246 711/103 |
| 2015/0058533 | A1* | 2/2015 | El-Batal ........... G06F 13/385 711/103 |
| 2016/0062424 | A1 | 3/2016 | Thomas et al. |
| 2016/0070336 | A1* | 3/2016 | Kojima ........... G06F 12/0246 711/103 |
| 2016/0179742 | A1 | 6/2016 | Nale et al. |
| 2016/0210187 | A1 | 7/2016 | Nale et al. |
| 2016/0239241 | A1* | 8/2016 | Hall ................ G06F 3/0676 |
| 2017/0177491 | A1 | 6/2017 | Seo |
| 2017/0255575 | A1 | 9/2017 | Niu et al. |
| 2017/0269837 | A1 | 9/2017 | Stevens, Jr. et al. |
| 2017/0322726 | A1* | 11/2017 | Walker ........... G06F 13/1626 |
| 2018/0059944 | A1* | 3/2018 | Helmick ........... G11C 29/52 |
| 2019/0087096 | A1* | 3/2019 | Ramanujan ...... G06F 12/0868 |
| 2019/0129656 | A1* | 5/2019 | Bains .............. G06F 3/0659 |
| 2019/0220224 | A1* | 7/2019 | Lu ................... G06F 3/061 |
| 2020/0201577 | A1* | 6/2020 | Longnos ........... G11C 16/10 |

* cited by examiner

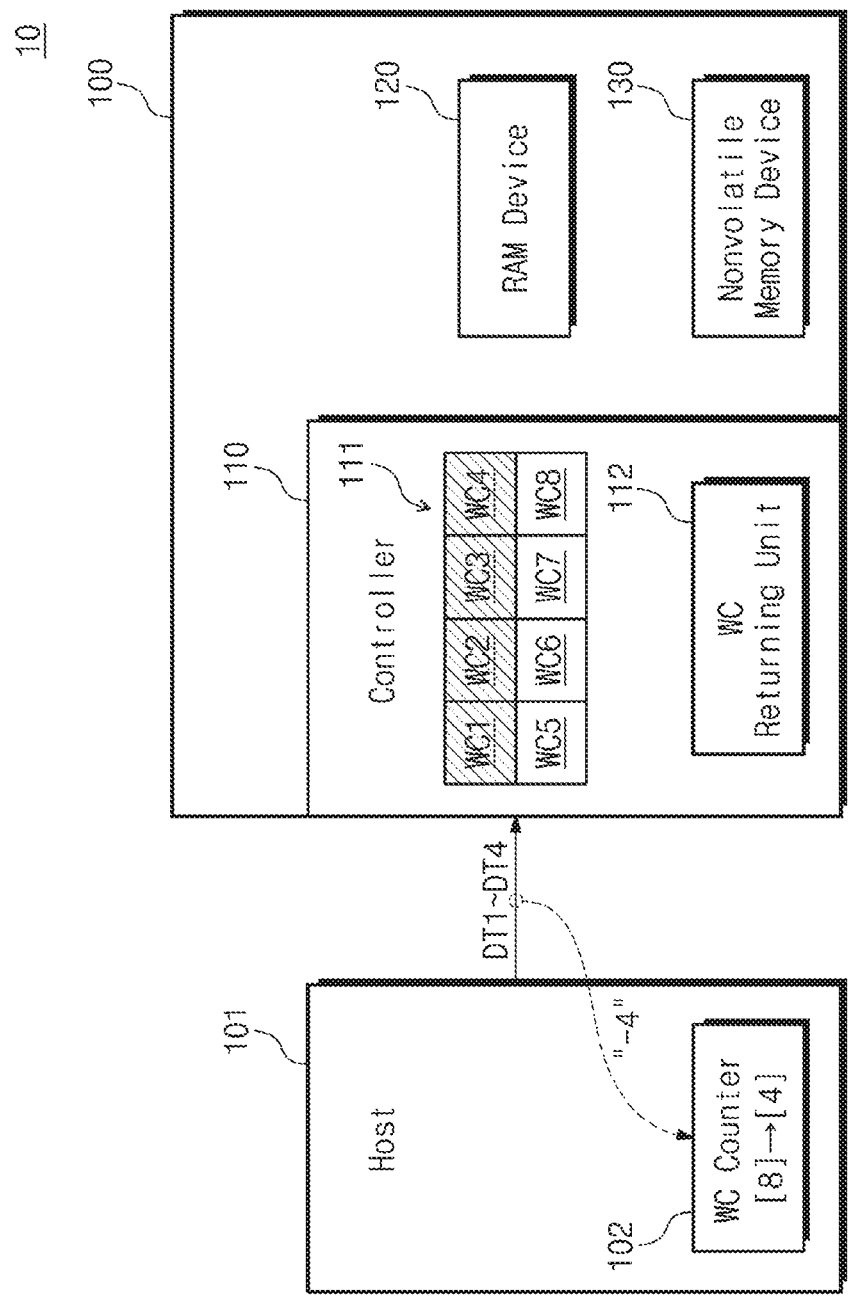

MEMORY MODULE, OPERATION METHOD THEROF, AND OPERATION METHOD OF HOST

CROSS-REFERENCE TO RELATED APPLICATIONS

This U.S. non-provisional patent application claims the benefit of U.S. Provisional Patent Application No. 62/625,044 filed Feb. 1, 2018, and priority under 35 U.S.C. § 119 to Korean Patent Application No. 10-2018-0019329, filed on Feb.19, 2018, the entire contents of which applications are hereby incorporated by reference herein.

BACKGROUND

Embodiments of the inventive concept described herein relate to a storage device, and more particularly, relate to a memory module, an operation method of the memory module, and operation method of a host.

Semiconductor memory devices are classified into volatile memory devices, which lose data stored therein at power-off, such as a static random access memory (SRAM), a dynamic RAM (DRAM), a synchronous DRAM (SDRAM), and the like, and nonvolatile memory devices, which retain data stored therein even at power-off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like.

As a kind of nonvolatile memory device, a flash memory is widely used as a storage device in virtue of advantages such as large capacity, low noise, low power, and the like. However, as the amount of data that are processed on a computing system increases, data throughput becomes greater than the data bandwidth or communication speed of an interface connected with the SSD devices, thereby causing data bottleneck. Since the data bottleneck causes a decrease in the performance of the computing system, various techniques are being developed to improve the performance.

SUMMARY

Embodiments of the inventive concept provide an operation method of a host, an operation method of a memory module, and an operation method of a memory system, which have improved performance, as a host manages a resource of the memory module.

According to some example embodiments, a memory module includes a random access memory (RAM) device that includes a first storage region and a second storage region, a nonvolatile memory device, and a controller that controls the RAM device or the nonvolatile memory device under control of a host. The controller includes a data buffer that temporarily stores first data received from the host, and a buffer returning unit that transmits first release information to the host when the first data are moved from the data buffer to the first storage region or the second storage region of the RAM device and transmits second release information to the host when the first data are moved from the second region to the nonvolatile memory device.

According to some example embodiments, a memory module includes a random access memory (RAM) device, a nonvolatile memory device, and a controller that controls the RAM device and the nonvolatile memory device under control of a host. The controller includes a data buffer that temporarily stores first data received from the host, and a buffer returning unit that transmits first release information to the host when the first data are moved from the data buffer to the RAM device or the nonvolatile memory device.

According to some example embodiments, an operation method of a memory device which includes a random access memory (RAM) device and a nonvolatile memory device includes receiving a first write command from a host, receiving first data corresponding to the first write command and temporarily storing the received first data in a data buffer, moving the first data from the data buffer to the RAM device, transmitting first release information to the host when the first data are moved from the data buffer to the RAM device, moving the first data from the RAM device to the nonvolatile memory device, and transmitting second release information to the host when the first data are moved from the RAM device to the nonvolatile memory device.

According to some example embodiments, an operation method of a host which is configured to communicate with a memory module includes transmitting a persist write command to the memory module and decreasing a first counter value indicating the number of first unit buffers available among first unit buffers included in the memory module and a second counter value indicating the number of second unit buffers available among second unit buffers included in the memory module, respectively, receiving first release information indicating the number of released first unit buffers of the first unit buffers from the memory module and increasing the decreased first counter value based on the received first release information, and receiving second release information indicating the number of released second unit buffers of the second unit buffers from the memory module and increasing the decreased second counter value based on the received second release information.

BRIEF DESCRIPTION OF THE FIGURES

The above and other objects and features of the inventive concept will become apparent by describing in detail example embodiments thereof with reference to the accompanying drawings.

FIGS. 2A to 2C are block diagrams for describing an operation between a he host and a controller of FIG. 1 according to some embodiments of the present inventive concept.

DETAILED DESCRIPTION

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below.

Below, embodiments of the inventive concept may be described in detail and clearly to such an extent that an ordinary one in the art easily implements the inventive concept.

Below, the terms "unit", "module", etc. means a software configuration, a hardware configuration, or a configuration of a combination thereof. For example, a "unit" that performs a certain function may be a hardware configuration for performing the certain function. A "module" including a certain function or certain configurations may be a configuration including various hardware configurations.

Conventional memory interfaces use a handshaking scheme to check the availability of memory space in a data buffer. However, messages related to the handshaking scheme for checking the availability of memory increases overhead for accessing the memory device, thereby potentially reducing performance and/or speed. According to various embodiments described herein, a host may manage resources by using counters to track the available memory. Writing of data may be allowed by estimating the availability of resources based on counters stored at the host. A controller may provide information related to memory that is freed or returned to the system to the host to aide in updating the counters.

Figure 1:
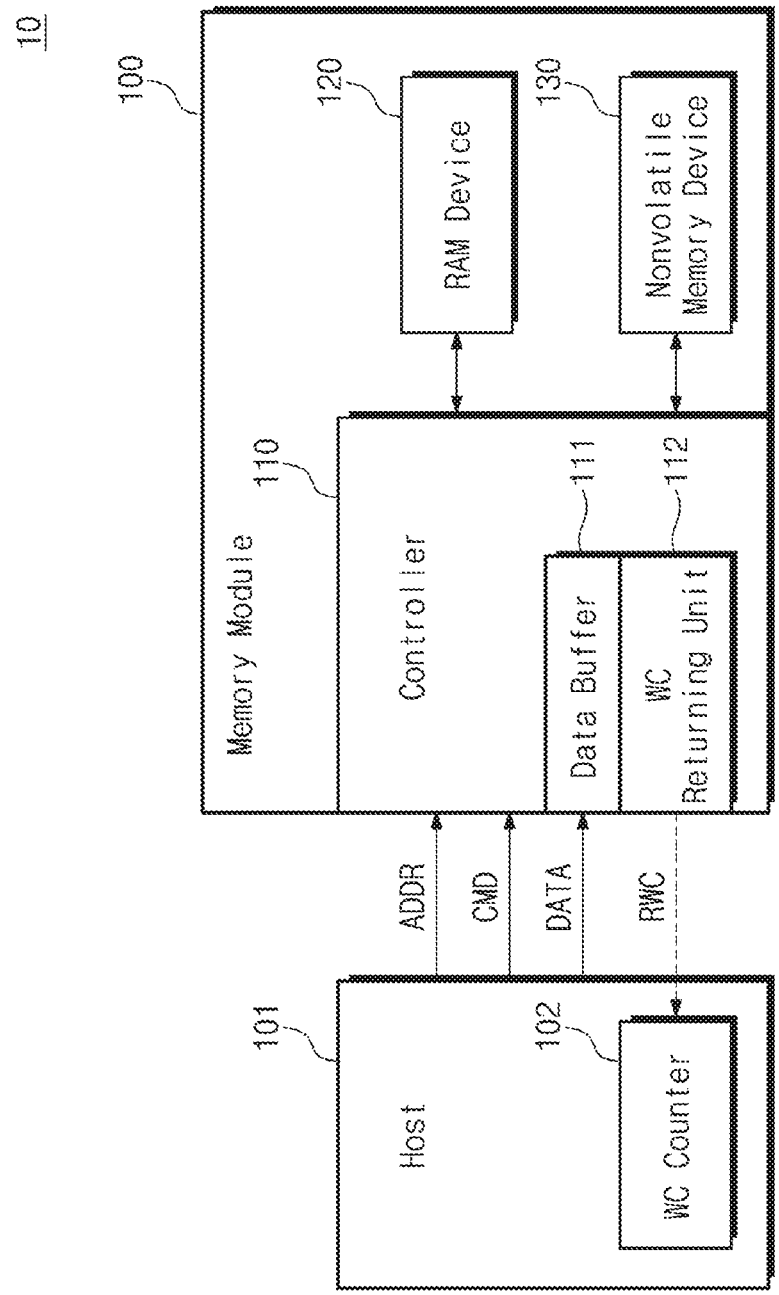
FIG. 1 is a block diagram illustrating a computing system according to some embodiments of the present inventive concept.

FIG. 1 is a block diagram illustrating a computing system 10 according to an embodiment of the inventive concept. Referring to FIG. 1, the computing system 10 may include a host 101 and a memory module 100. The host 101 may store data in the memory module 100 or may read data stored in the memory module 100. For example, to store data "DATA" in the memory module 100, the host 101 may transmit an address ADDR, a command CMD, and the data "DATA" to the memory module 100. In some example embodiments, the host 101 may be a central processing unit (CPU) for controlling an operation of the computing system 10.

The memory module 100 may include a controller 110, a RAM device 120, and a nonvolatile memory device 130. For example, the memory module 100 may communicate with the host 101 through a double data rate (DDR) interface and may be a memory module of an NVDIMM-P type. For example, the controller 110, the RAM device 120, and the nonvolatile memory device 130 may be integrated on the same printed circuit board (PCB) (not illustrated) to constitute the memory module 100. Also, the memory module 100 may further include various other components in addition to the components illustrated in FIG. 1. However, the inventive concept is not limited thereto.

Under control of the host 101, the controller 110 may store data "DATA" in the RAM device 120 or the nonvolatile memory device 130 or may read data "DATA" stored in the RAM device 120 or the nonvolatile memory device 130.

In some example embodiments, the RAM device 120 may have a faster operating speed than the nonvolatile memory device 130. For example, the RAM device 120 may be a memory device, which supports a high-speed operation, an SRAM or a DRAM, and the nonvolatile memory device 130 may be a nonvolatile memory device, which retains data even though power is not supplied, such as a flash memory. However, the inventive concept is not limited thereto. For example, the RAM device 120 and the nonvolatile memory device 130 may be implemented with various memory devices.

To describe an embodiment of the inventive concept easily, the RAM device 120 is illustrated as being independent of the controller 110, but the inventive concept is not limited thereto. For example, the RAM device 120 may be included inside the controller 110.

The controller 110 according to an embodiment of the inventive concept may include a data buffer 111 and a write credit (WC) returning unit 112. The data buffer 111 may be a storage circuit for receiving data "DATA" from the host 101 or for temporarily storing the received data "DATA". For example, the data "DATA" received from the host 101 may be first written in the data buffer 111. Afterwards, the data "DATA" stored in the data buffer 111 may be transmitted to the RAM device 120 or the nonvolatile memory device 130.

That is, the data buffer 111 may be a high-speed storage circuit that satisfies an interface speed between the host 101 and the controller 110. The data buffer 111 may be a register or high-speed memory included in an interface layer or a physical layer between the host 101 and the controller 110.

For example, the data buffer 111 may include write credits WC having a preset size. That is, "WC" may indicate a storage space of a preset unit or a unit buffer. For example, in the case where the data buffer 111 is 512 KB and one write credit WC is 4 KB, the total number of write credits WC associated with the data buffer 111 may be 128.

The host 101 may include a write credit (WC) counter 102. The WC counter 102 may include information about the number of available write credits WC of the write credits WC of the data buffer 111. The host 101 may perform a write operation on the memory module 100 based on the WC counter 102. For example, in the case where a unit of one write credit WC is 4 KB and a value of the WC counter 102 is "8", the host 101 may transmit write data of "4*8=32 KB" to the memory module 100.

The host 101 may update the WC counter 102 based on the size of transmitted write data (or the number of issued write command or the number of units of transmitted write data). For example, in the case where a unit of one write credit WC is 4 KB and the host 101 transmits write data of 16 KB, the host 101 may use four write credits WC. In this case, the host 101 may subtract a value (i.e., 4) corresponding to the number of used write credits WC from a current value of the WC counter 102. That is, in the case where the host 101 transmits write data of 16 KB, the WC counter 102 may be updated from "8" to "4".

In some example embodiments, in the case where a value of the WC counter 102 is "0", since a write credit WC that is available by the host 101 does not exist, the host 101 cannot transmit write data to the controller 110.

In some example embodiments, a WC returning unit 112 of the controller 110 may provide WC release information RWC to the host 101. For example, in the case where first data stored in a first write credit WC of the data buffer 111 are transmitted to the RAM device 120 or the nonvolatile memory device 130, the first write credit WC of the data buffer 111 may be released. "That the first write credit WC is released" means that the first write credit WC may be used by the host 101. In other words, the released first write credit WC may be used to store data received from the host 101. The WC returning unit 112 may provide the host 101 with the WC release information RWC about the write credits WC released as described above.

The host 101 may update the WC counter 102 based on the WC release information RWC from the controller 110. For example, as described above, the WC release information RWC indicates the number of write credits WC released by an operation of the controller 110 among used write credits WC of the data buffer 111. In other words, the WC release information RWC may indicate the number of write credits WC available by the host 101. In the case where the WC release information RWC indicates "4", the host 101 may add a value of "4" to the WC counter 102.

In some example embodiments, the WC release information RWC may be provided in an asynchronous scheme. For example, in the case where a write credit WC is released, the controller 110 may transmit a return signal to the host 101. The host 101 may receive the WC release information RWC from the controller 110 in response to the return signal. In some example embodiments, the WC release information RWC may be provided through the same signal line as data "DATA". In some embodiments, the WC release information RWC may be provided to the host 101 through a separate signal line or a separate communication channel.

In some embodiments, the WC release information RWC may be transmitted by an explicit request of the host 101. In some embodiments, the WC release information RWC may be transmitted to the host 101 together with read data corresponding to a read request of the host 101.

As described above, the host 101 may manage available write credits WC of the data buffer 111 of the controller 110, and the controller 110 may transmit information about a released write credit WC (i.e., WC release information RWC) to the host 101. Accordingly, there may be prevented a decrease in speed upon transmitting data between the host 101 and the controller 110.

Figure 2A:
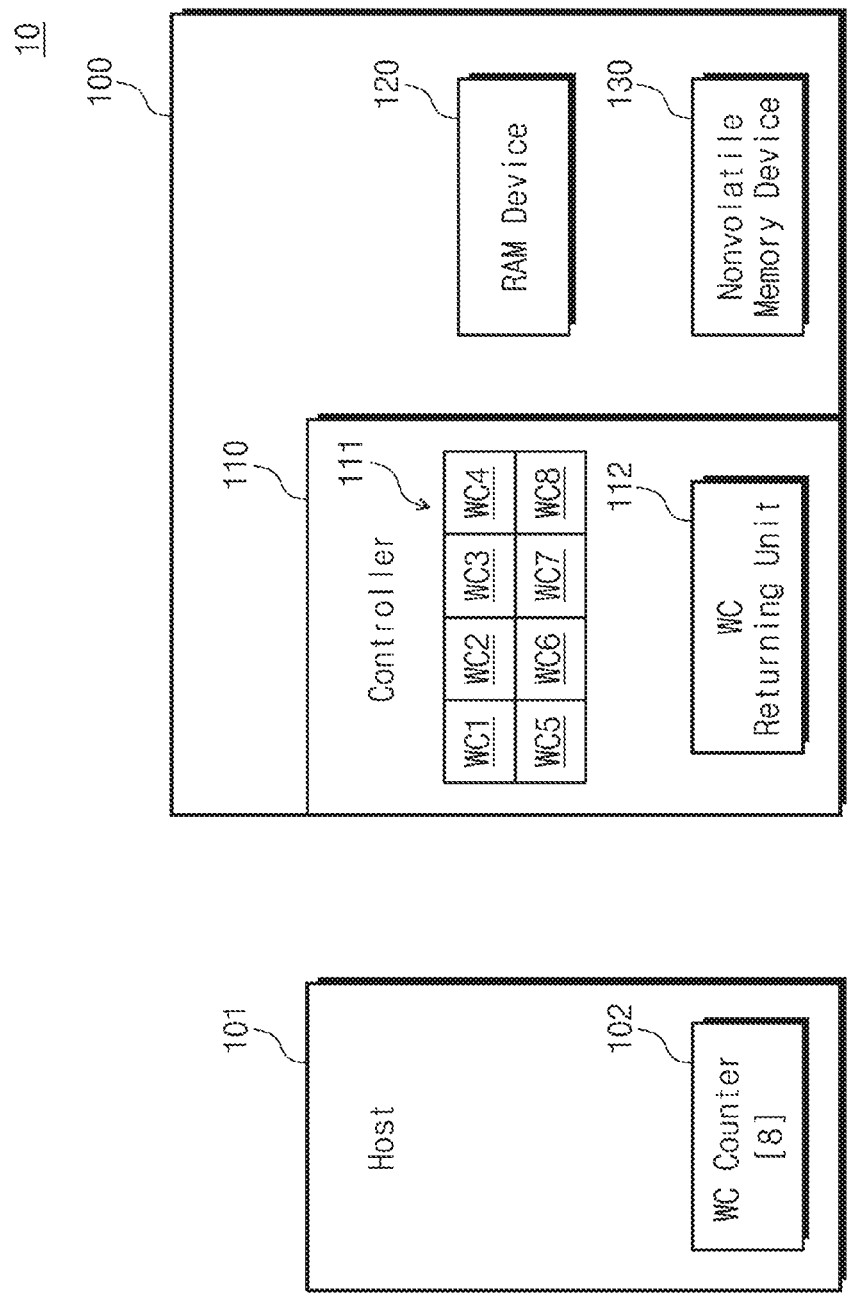
Figure 2C:
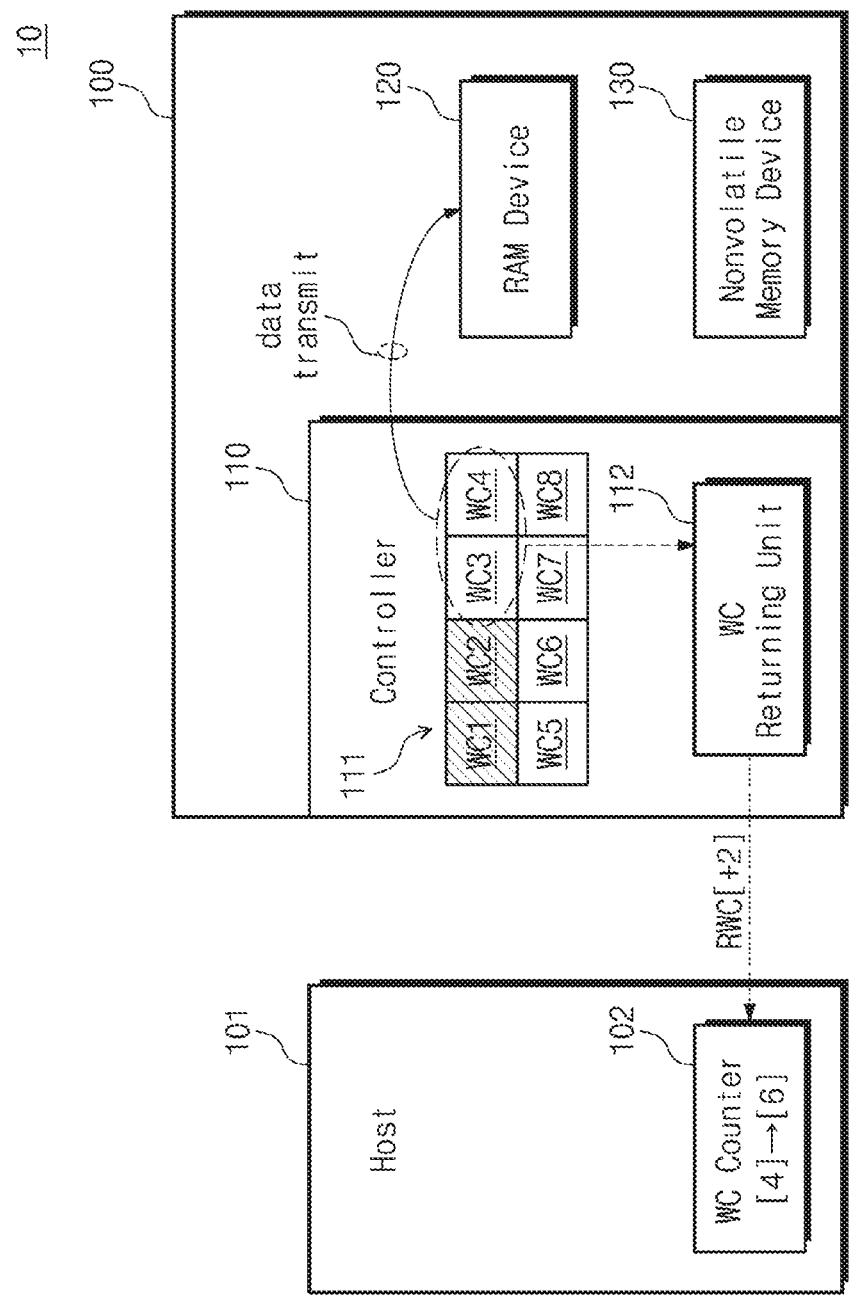

FIGS. 2A to 2C are block diagrams for describing an operation between the host 101 and the controller 110 of FIG. 1. For brevity, a description associated with the above-described components will not be repeated here.

Below, various expressions having a certain meaning are used to describe some embodiments of the inventive concept briefly and clearly. For example, the "use of a write credit WC by a host" means that the host assigns or uses write data to transmit the write data or that the host transmits write data to a write credit WC. Also, the "release of a write credit WC" indicates a state in which another write data may be received as write data stored in a write credit WC are transmitted to a RAM device or a nonvolatile memory device. In addition, "that write data stored in a write credit WC are transmitted to a RAM device or a nonvolatile memory device" means that write data stored in the write credit WC are copied or migrated to the RAM device or the nonvolatile memory device. The above-described expressions are to describe embodiments of the inventive concept briefly and clearly, and the inventive concept is not limited thereto.

For convenience of description, it is assumed that the data buffer 111 includes eight (8) write credits WC1 to WC8. Also, it is assumed that the size of write data to be transmitted from the host 101 to the controller 110 is identical to that of one write credit WC. That is, the size of one write data may be identical to the size of one write credit WC, and one write data may be stored in one write credit WC.

Referring to FIGS. 2A to 2C, the computing system 10 includes the host 101 and the memory module 100. The host 101 includes the WC counter 102. The memory module 100 may include the controller 110, the RAM device 120, and the nonvolatile memory device 130. Each component is described above, and thus, a detailed description thereof will not be repeated here.

As illustrated in FIG. 2A, in an initial state, a value of the WC counter 102 may be "8". This state indicates a state in which the 8 write credits WC1 to WC8 are available in the data buffer 111.

Afterwards, as illustrated in FIG. 2B, the host 101 may perform a write operation on first to fourth write data DT1 to DT4. In this case, the host 101 may use four write credits WC1 to WC4. That is, the first to fourth write data DT1 to DT4 received from the host 101 may be respectively stored in the first to fourth write credits WC1 to WC4. The host 101 may subtract a value of the WC counter 102 by the number of used write credits (i.e., by 4). In this case, the value of the WC counter 102 may be set to "4" (=8−4). This means that the number of write credits available in the data buffer 111 is "4".

Although not illustrated in FIG. 2B, the host 101 may update the WC counter 102 based on the number of write commands transmitted to the controller 110. For example, the size of write data for one write command may correspond to the size of one write credit. In the case where four write commands are transmitted to the controller 110, the host 101 may decrease the value of the WC counter 102 by 4, i.e. adding "−4" to the counter.

Next, as illustrated in FIG. 2C, some write credits may be released by an operation of the controller 110. For example, write data stored in the third and fourth write credits WC3 and WC4 may be transmitted to the RAM device 120. In this case, the third and fourth write credits WC3 and WC4 may be released.

The WC returning unit 112 may transmit the WC release information RWC about released write credits to the host 101. As illustrated in FIG. 2C, since the third and fourth write credits WC3 and WC4 are released, the WC release information RWC may be information providing notification that two write credits are released. The host 101 may update the WC counter 102 based on the WC release information RWC. For example, as described above, since two write credits are released, the host 101 may increase the value of the WC counter 102 by "+2". In this case, the value of the WC counter 102 may be set to "6". This means that six write credits are available in the data buffer 111.

As described above, in the case where the host 101 transmits write data to the controller 110, the WC counter 102 of the host 101 may be updated (or a value of the WC counter 102 may be subtracted) based on the number or the size of transmitted write data or the number of transmitted write commands. Also, in the case where write credits of the data buffer 111 are released by an operation of the controller 110, the controller 110 may transmit the WC release information RWC to the host 101, and the host 101 may update (or may add a value to) the WC counter 102 based on the WC release information RWC. Accordingly, since a resource of the memory module 100 may be recognized without a periodic polling operation or a separate confirm operation of the host 101, the performance of write operation may be improved.

Figure 3:
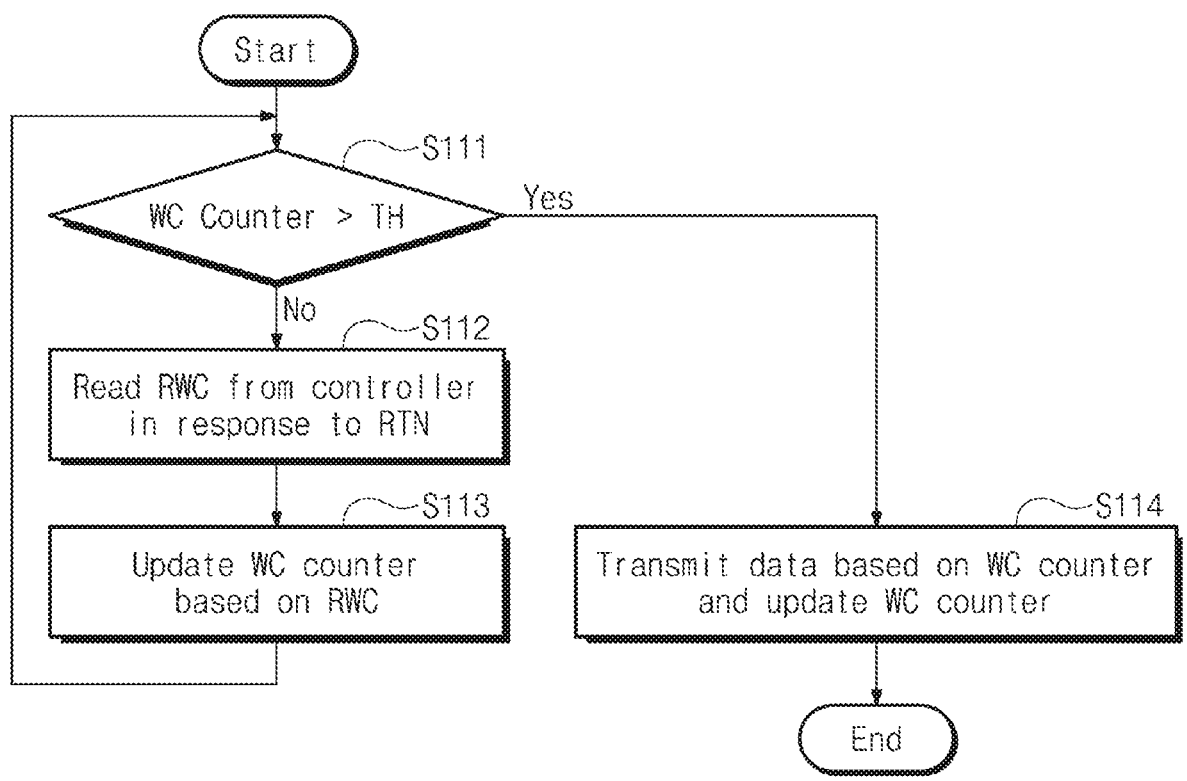
FIG. 3 is a flowchart illustrating an example operation of a host of FIG. 1 according to some embodiments of the present inventive concept.

FIG. 3 is a flowchart illustrating example operations of the host 101 of FIG. 1. Referring to FIGS. 1 and 3, in operation S111, the host 101 may determine whether the number of available write credits is greater than a reference value TH. For example, a value of the WC counter 102 of the host 101 may indicate the number of available write credits. The host 101 may determine whether the value of the WC counter 102 is greater than the reference value TH. In some example embodiments, the reference value TH may be "0" or an integer greater than "0" depending on an operation mode or a type of a write command.

In some example embodiments, if the number of available write credits is not greater than the reference value TH, the controller 110 may not include enough available write credits receive write data transmitted from the host 101. In this case, even though the host 101 transmits write data to the controller 110, the controller 110 cannot normally receive write data or may lose previously received data. For this reason, the host 101 may not perform a write operation until available write credits are secured.

For example, in the case where the number of available write credits is not greater than the reference value TH, in operation S112, the host 101 may read the WC release information RWC from the controller 110. For example, the host 101 may transmit a return command for reading the WC release information RWC to the controller 110. In this case, the return command may be transmitted by an operation of the host 101 itself or may be transmitted in response to the return signal RTN from the controller 110. In some example embodiments, the return command may be a command in advance defined by an interface between the host 101 and the memory module 100, or a vendor command, or a combination of commands. In some embodiments, the host 101 may transmit a read command for reading normal read data to the controller 110, and the controller 110 may transmit the WC release information RWC to the host 101 together with the read data corresponding to the read command. As described above, the host 101 may read the WC release information RWC from the controller 110 based on various schemes.

In operation S113, the host 101 may update the WC counter 102 based on the WC release information RWC. For example, as described above, the host 101 may add a value, which the WC release information RWC indicates, to a value of the WC counter 102. Afterwards, the host 101 may perform operation S111.

In the case where the comparison result of operation S111 indicates that the number of available write credits is greater than the reference value TH, the host 101 may perform operation S114. In operation S114, the host 101 may transmit write data to the controller 110 based on the WC counter 102 and may update the WC counter 102 based on the transmitted write data.

For example, the host 101 may transmit write data to the controller 110 based on a value of the WC counter 102. In this case, the size of the transmitted write data may be smaller than or identical to the size corresponding to the value of the WC counter 102. The host 101 may subtract the value of the WC counter 102 based on the size of the transmitted write data. In some example embodiments, the host 101 may subtract the value of the WC counter 102 based on the number of transmitted write commands.

Figure 4:
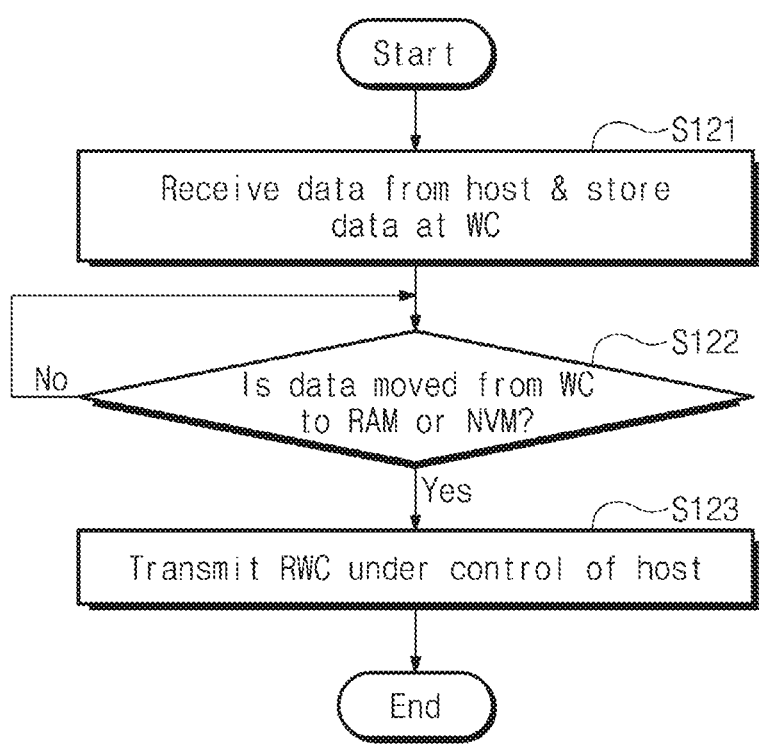
FIG. 4 is a flowchart illustrating an operation of a controller of FIG. 1 according to some embodiments of the present inventive concept.

FIG. 4 is a flowchart illustrating operations of the controller 110 of FIG. 1. Referring to FIGS. 1 and 4, in operation S121, the controller 110 may receive data from the host 101 and may store the received data in a write credit. For example, operations of receiving data and storing the received data may be performed simultaneously, partially overlapping in time, or sequentially.

In operation S122, the controller 110 may determine whether data are moved from a write credit to the RAM device 120 or the nonvolatile memory device 130. For example, as described above, data stored in a write credit may be moved to the RAM device 120 or the nonvolatile memory device 130 depending on an operation of the controller 110. In this case, the write credit in which the data are stored may be released.

In the case where data are moved from a write credit to the RAM device 120 or the nonvolatile memory device 130, in operation S123, the controller 110 may transmit the WC release information RWC to the host 101 under control of the host 101. For example, the controller 110 may transmit the WC release information RWC to the host 101 in response to a return request from the host 101. For example, the return request may be issued by the host 101 in response to the return signal RTN of the controller 110 or may be issued by an operation of the host 101 itself. In some embodiments, the controller 110 may transmit read data corresponding to a read command and the WC release information RWC to the host 101 in response to the read command from the host 101.

Figure 5A:
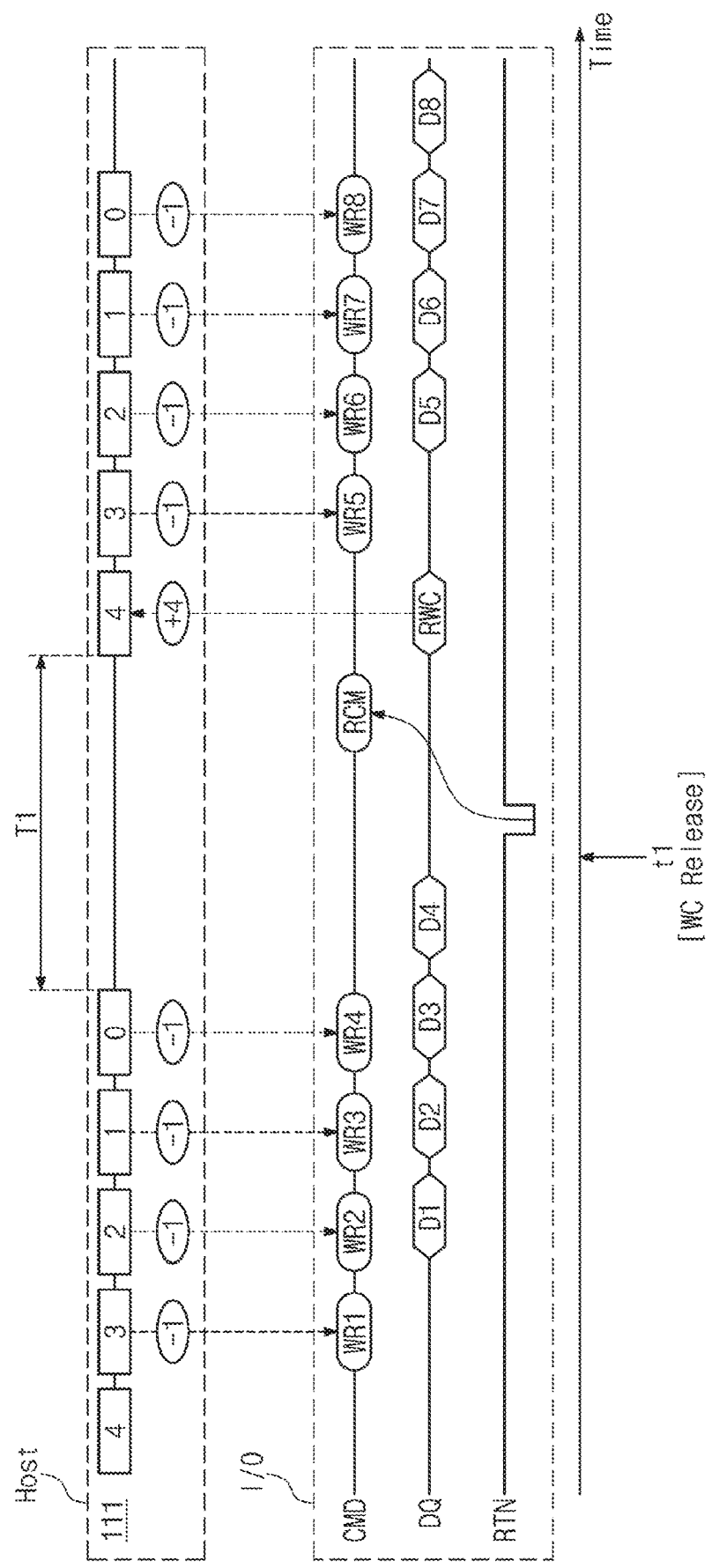
FIGS. 5A to 5C are timing diagrams for describing operations of a host and a controller of FIG. 1 according to some embodiments of the present inventive concept.
Figure 5B:
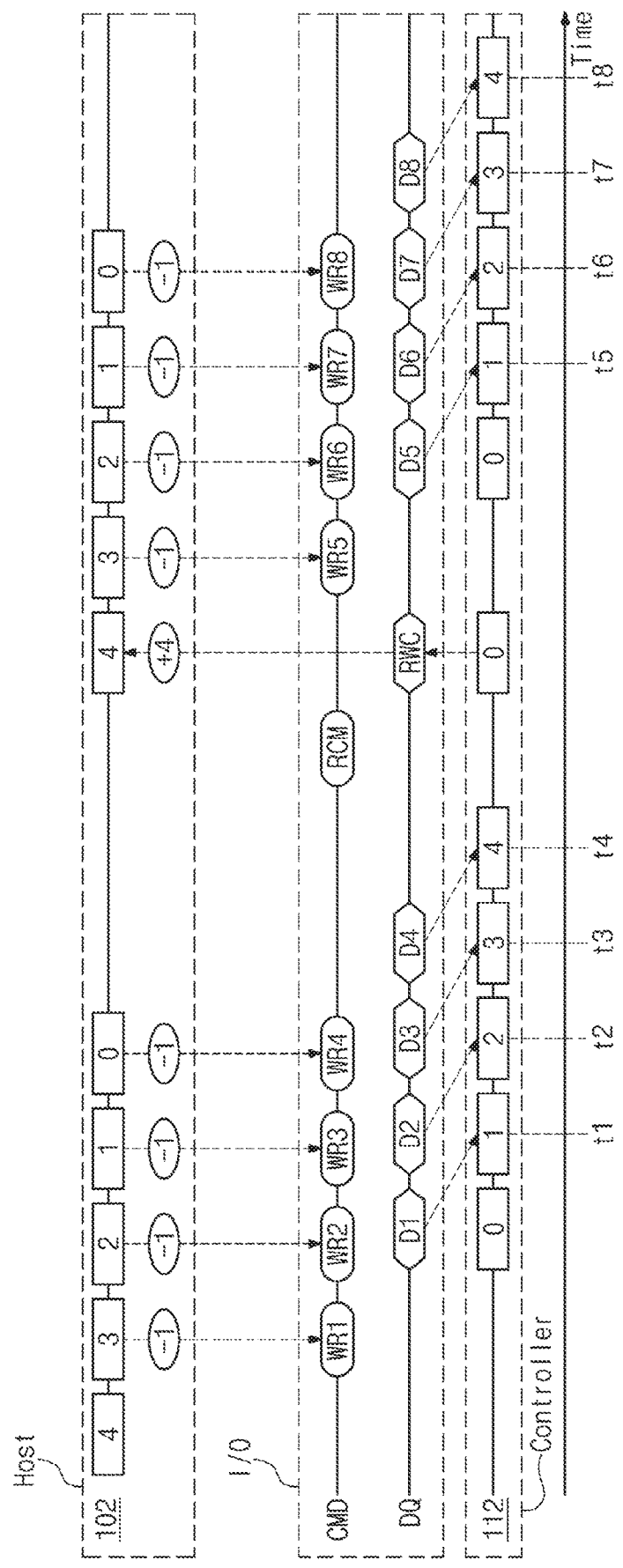
Figure 5C:
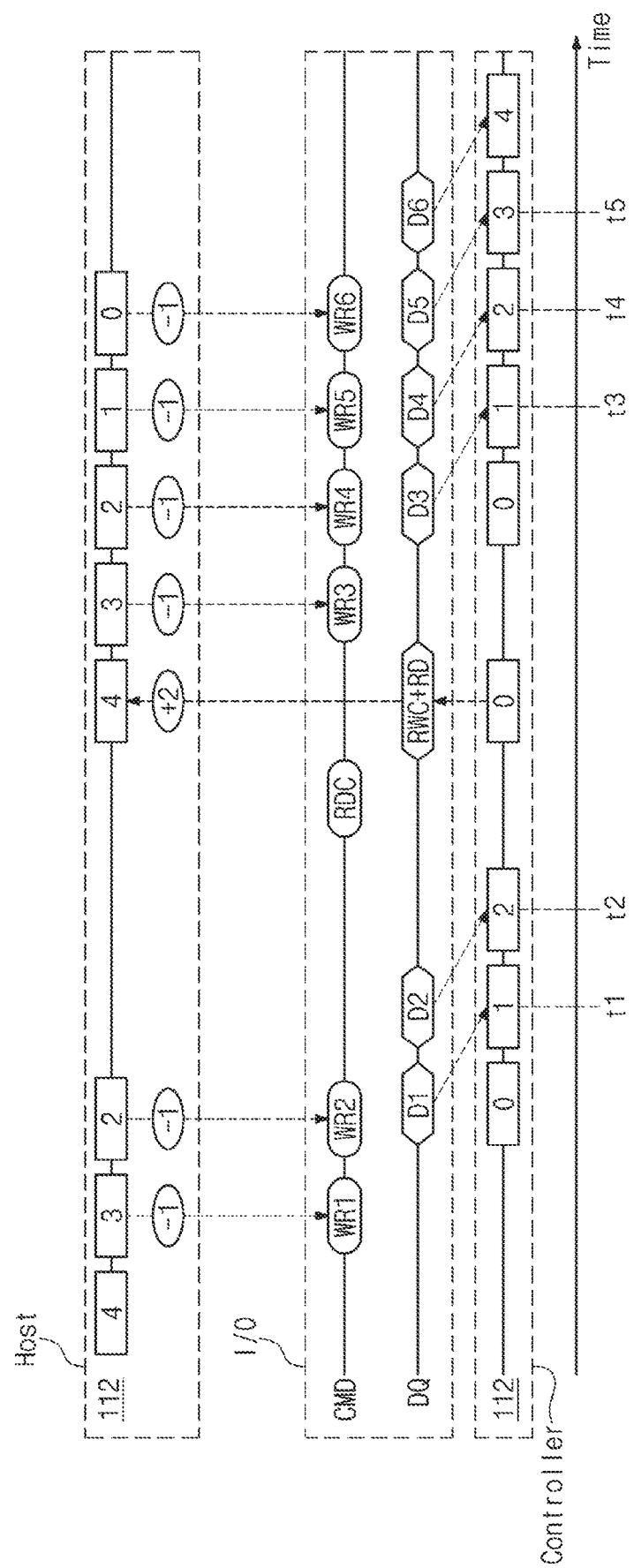

FIGS. 5A to 5C are timing diagrams for describing operations of the host 101 and the controller 110 of FIG. 1. Below, components that are unnecessary to describe an embodiment of the inventive concept are omitted. Also, it is assumed that an initial value of the WC counter 102 is "4". In addition, it is assumed that the size of write data "D" for one write command WR is identical to the size of one write credit. That is, the write data "D" for one write command may be stored in one write credit. In other words, the host 101 may use one write credit to transmit the write data "D" for one write command.

First, referring to FIGS. 1 and 5A, an initial value of the WC counter 102 may be "4". This state may indicate a state in which four write credits are available in the data buffer 111.

The host 101 may perform a write operation based on the WC counter 102. For example, in the case where the value of the WC counter 102 is "4", the host 101 may transmit four write commands WR1 to WR4 and four write data D1 to D4 respectively corresponding to the commands WR1 and WR4 to the controller 110.

The host 101 may update the WC counter 102 upon transmitting the respective write commands WR1 to WR4. For example, in the case where the host 101 transmits the first write command WR1, the host 101 may decrease the value of the WC counter 102 by "−1" (i.e., from "4" to "3"). In the case where the host 101 transmits the second write command WR2, the host 101 may decrease the value of the WC counter 102 by "−1" (i.e., from "3" to "2"). That is, the host 101 may subtract the value of the WC counter 102 one by one, whenever a write command is transmitted. The reason is that the host 101 uses a write credit of the data buffer 111 for the purpose of transmitting write data. In other words, the write data corresponding to a write command of the host 101 are stored in any one write credit of the data buffer 111 in the controller 110. It will be understood that, although the terms first, second, third, etc. may be used herein to describe various elements, elements should not be limited by these terms; rather, these terms are only used to distinguish one element from another element. Thus, a first element discussed below could be termed a second element without departing from the scope of the present inventive concepts.

After the fourth write command WR4 is transmitted, the value of the WC counter 102 may be "0". In this case, since an available write credit does not exist, the host 101 cannot transmit a write command or write data to the controller 110. In other words, the host 101 may not perform a write operation during a first time T1, which corresponds to a time period where the WC counter 102 is "0".

At a first time point t1, a write credit may be released according to an operation of the controller 110. For example, as described above, depending on the operation of the controller 110, a part of write data stored in the data buffer 111 may be transmitted to the RAM device 120 or the nonvolatile memory device 130. In this case, a region (in other words, a write credit) of the data buffer 111, in which the partial data are stored, may be released.

The WC returning unit 112 of the controller 110 may detect a release of a write credit at the first time point t1 and may transmit the return signal RTN to the host 101. For example, the return signal RTN may be provided through a signal line, and the return signal RTN may have a low logic level. However, the inventive concept is not limited thereto.

The host 101 may transmit a return command RCM to the controller 110 in response to the return signal RTN. The return command RCM may be a command for reading the WC return information RWC. The controller 110 may provide the host 101 with the WC release information RWC through a data line DQ in response to the return command RCM.

The host 101 may update the WC counter 102 based on the received WC release information RWC. For example, since the WC release information RWC indicates that four write credits are released, the host 101 may increase the value of the WC counter 102 from "0" to "4".

Afterwards, the host 101 may perform a write operation based on the updated WC counter 102. For example, the host 101 may transmit four write commands WR5 to WR8 and four write data D5 to D8 respectively corresponding to the write commands WR5 to WR8 to the controller 110. As above described, the host 101 may update the WC counter 102 whenever each of the write commands WR5 to WR8 is transmitted (i.e., may decrease a value of the WC counter 102 by "−1" upon transmitting each of the write commands WR5 to WR8).

In some example embodiments, the WC release information RWC may be provided in an asynchronous scheme, as illustrated in FIG. 5a. In some embodiments, although not illustrated in FIG. 5a, the WC release information RWC may be provided to the host 101 periodically, i.e. occurring every certain periods of time.

In some example embodiments, Table 1 shows a method of updating the WC counter 102.

TABLE 1

| | Count "m" of issued Write command | Count "n" of returned WC |
|---|---|---|
| Variation of WC counter | −m | +n |

Referring to Table 1, a value of the WC counter 102 may be decreased by a write command issuing count "m" of the host 101. The reason is that write credits of the data buffer 111 in the controller 110 are used by the number of write commands. The value of the WC counter 102 may be increased by a return quantity "n" of write credits (i.e., by the number of released write credits), since the released write credits are available by the host 101. As described above, the host 101 may manage the number of available write credits of the data buffer 111 in the controller 110. Also, the controller 110 may provide the host 101 with the WC release information RWC indicating the number of released write credits, and the host 101 may update the WC counter 102 based on the received WC release information RWC. Accordingly, the performance of write operation of the host 101 is improved.

Next, referring to FIGS. 1 and 5B, the WC returning unit 112 may accumulate WC release information whenever a write credit is released. For example, at a first time point t1 of FIG. 5B, first data D1 may be moved to the RAM device 120. In this case, a write credit in which the first data D1 are stored may be released. Likewise, at each of second to fourth time points t2, t3, and t4, each of second, third, and fourth data D2, D3, and D4 may be moved from a write credit to the RAM device 120 depending on an operation of the controller 110. In this case, the WC returning unit 112 may accumulate the WC release information RWC at each of the first to fourth time points t1 to t4. As a result, the WC release information RWC may have a value of "4" at the fourth time point t4 since the number of released write credits is "4".

Afterwards, the host 101 may transmit the return command RCM to the controller 110. For example, the return command RCM may be automatically issued at the host 101 without a separate signal (e.g., a return signal) from the controller 110.

The controller 110 may transmit the WC release information RWC to the host 101 in response to the return command RCM. In the case where the WC release information RWC is "4", a value accumulated in the WC returning unit 112 may be decreased by "−4". That is, in the case where the WC release information RWC is transmitted to the host 101, a value accumulated in the WC returning unit 112 may be reset.

The host 101 may update the WC counter 102 based on the received WC release information RWC. Afterwards, the host 101 may transmit fifth to eighth write commands WR5 to WR8 and fifth to eighth data D5 to D8 corresponding to the write commands WR5 to WR8 to the controller 110 and may update the WC counter 102.

Referring to FIGS. 1 and 5C, the host 101 may transmit a read command RDC for reading read data to the controller 110. The controller 110 may transmit read data RD to the host 101 in response to the read command RDC. In this case, the controller 110 may transmit accumulated WC release information RWC together with the read data RD. For example, the controller 110 may transmit a data packet, in which the WC release information RWC and the read data RD are included, to the host 101.

The host 101 may update the WC counter 102 based on the received WC release information RWC. The remaining operation is described above, and thus, a detailed description thereof will not be repeated here.

Figure 6:
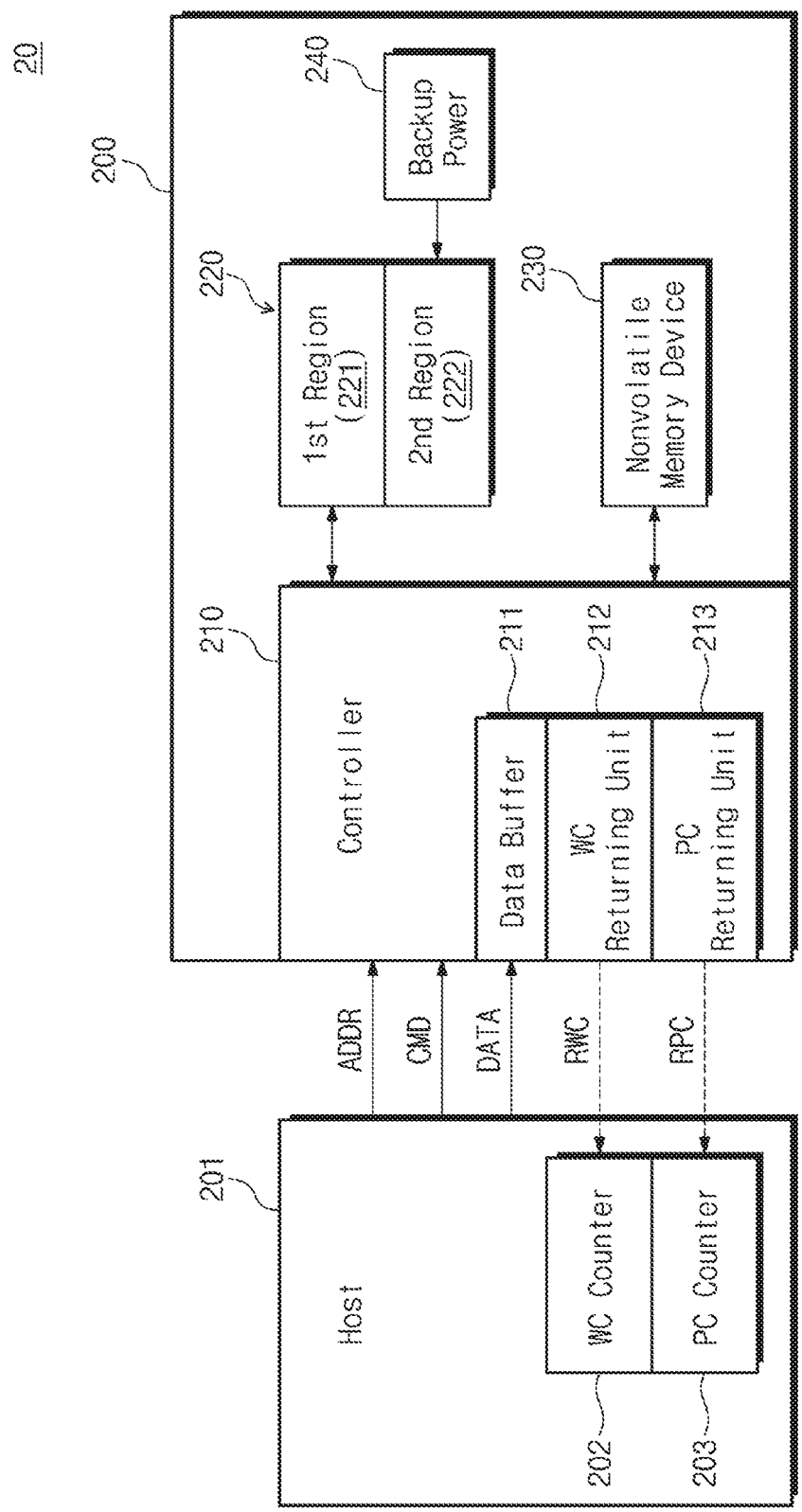
FIG. 6 is a block diagram illustrating a computing system according to some embodiments of the present inventive concept.

FIG. 6 is a block diagram illustrating a computing system 20 according to an embodiment of the inventive concept. Referring to FIG. 6, the computing system 20 may include a host 201 and a memory module 200. The memory module 200 may include a controller 210, a RAM device 220, a nonvolatile memory device 230, and a backup power 240. The host 201, the memory module 200, the controller 210, the RAM device 220, and the nonvolatile memory device 230 are described above, and thus, a detailed description thereof will not be repeated here.

The RAM device 220 may include a first region 221 and a second region 222. The first and second regions 221 and 222 may be a storage space for storing data. In the case where a power supply to the memory module 200 is cut off, data stored in the first region 221 may be lost. In contrast, even though a power supply to the memory module 200 is cut off, data stored in the second region 222 may be retained.

For example, the backup power 240 may supply auxiliary power to the memory module 200 when a power supply to the memory module 200 is cut off (i.e., sudden power-off (SPO)). In the case where the power supply is cut off, data stored in the second region 222 may be retained by using the auxiliary power from the backup power 240. In the case where the power supply is cut off, the data stored in the second region 222 may be flushed to the nonvolatile memory device 230 by using the auxiliary power from the backup power 240. That is, even though the power supply is cut off, data stored in the second region 222 may be retained by using the backup power 240. That is, a partial region of the RAM device 220 (i.e., the second region 222) may be a power backed storage region.

The host 201 may include a WC counter 202 and a persist credit (PC) counter 203. The controller 210 may include a data buffer 211, a WC returning unit 212, and a PC returning unit 213. The WC counter 202, the data buffer 211, and the WC returning unit 212 are above described, and thus, a detailed description will not be repeated here.

The PC counter 203 may manage the number of available persist credits. For example, the second region 222 of the RAM device 220 may be divided into a plurality of persist credits PC. The persist credit PC may indicate a unit storage space that may store data regardless of a power supply. In other words, the persist credit PC may indicate storage space for persistently stored data. That is, in the case where the second region 222 of the RAM device 220 is 512 KB and a unit of one persist credit PC is 4 KB, the second region 222 of the RAM device 220 may include 128 persist credits. In some example embodiments, one persist credit PC of the RAM device 220 may have the same size as one write credit WC, but the inventive concept is not limited thereto.

In some example embodiments, in a certain type of a write operation, the host 201 may transmit write data to the controller 210 by using a persist credit PC. For example, the host 201 may perform a persist write operation. The persist write operation indicates an operation in which retaining of write data provided from the host 201 is secured even though a power supply is cut off. In other words, even though a power supply is cut off, data written in the memory module 200 may be retained by the persist write operation.

As described above, the second region 222 of the RAM device 220 indicates a storage region in which data are retained persistently, even though a power supply is cut off. Accordingly, in the persist write operation, the host 201 may write the write data by using the second region 222 of the RAM device 220. In this case, as in the use of the write credit WC described above, the host 201 may transmit write data by using a persist credit PC of the RAM device 220.

In the case of performing the persist write operation, the host 201 may update (or decrease a value of) the PC counter 203 based on the size of write data or the number of persist write commands.

In some example embodiments, in the persist write operation, write data received from the host 201 may be transmitted to a persist credit PC of the second region 222 after being first stored in a write credit WC of the data buffer 211. That is, the host 201 may perform the persist write operation by using both a write credit WC and a persist credit PC. In this case, the host 201 may update (or decrease values of) the WC counter 202 and the PC counter 203 based on the size of write data or the number of persist write commands.

The PC returning unit 213 of the controller 210 may provide the host 201 with persist credit (PC) release information RPC of the second region 222 in the RAM device 220. For example, as described above, in the persist write operation, persist credits of the second region 222 in the RAM device 220 may be used by the host 201. Afterwards, a persist credit PC in which certain data are stored may be released as the certain data stored in the second region 222 are transmitted to the nonvolatile memory device 230 depending on an operation of the controller 210. The PC returning unit 213 may transmit the PC release information RPC about the number of released persist credits to the host 201. In some example embodiments, as in the WC release information RWC, the PC release information RPC may be provided in an asynchronous scheme. In some embodiments, as in the WC release information RWC, the PC release information RPC may be provided to the host 201 by a return command or a read command of the host 201.

The host 201 may update the PC counter 203 based on the PC release information RPC. For example, the PC release information RPC may include information about the number of released persist credits PC. The host 201 may increase the value of the PC counter 203 by the number of released persist credits PC.

As described above, the host 201 may manage one or both of the numbers of available write credits and persist credits of the memory module 200 based on the WC counter 202 and the PC counter 203.

The WC returning unit 212 and the PC returning unit 213 are illustrated as being independent of each other, but the inventive concept is not limited thereto. The WC returning unit 212, the PC returning unit 213, or a combination thereof may be implemented with one hardware configuration or one software configuration as a buffer returning unit. The WC returning unit 212 and the PC returning unit 213 implemented in the form of software may be driven by a separate processor.

FIGS. 7A to 7D and 8 are views for describing operations of the host 201 and the controller 210 of FIG. 6. For a brief description, a detailed description associated with components that are unnecessary in each operation will not be repeated here.

Referring to FIGS. 7A to 7D and 8, the computing system 20 may include the host 201 and the memory module 200. The host 201 may include the WC counter 202 and the PC counter 203. The memory module 200 may include the controller 210, the RAM device 220, and the nonvolatile memory device 230. The controller 210 may include the data buffer 211, the WC returning unit 212, and the PC returning unit 213. Each component is described above, and thus, a detailed description thereof will not be repeated here.

Figure 7A:
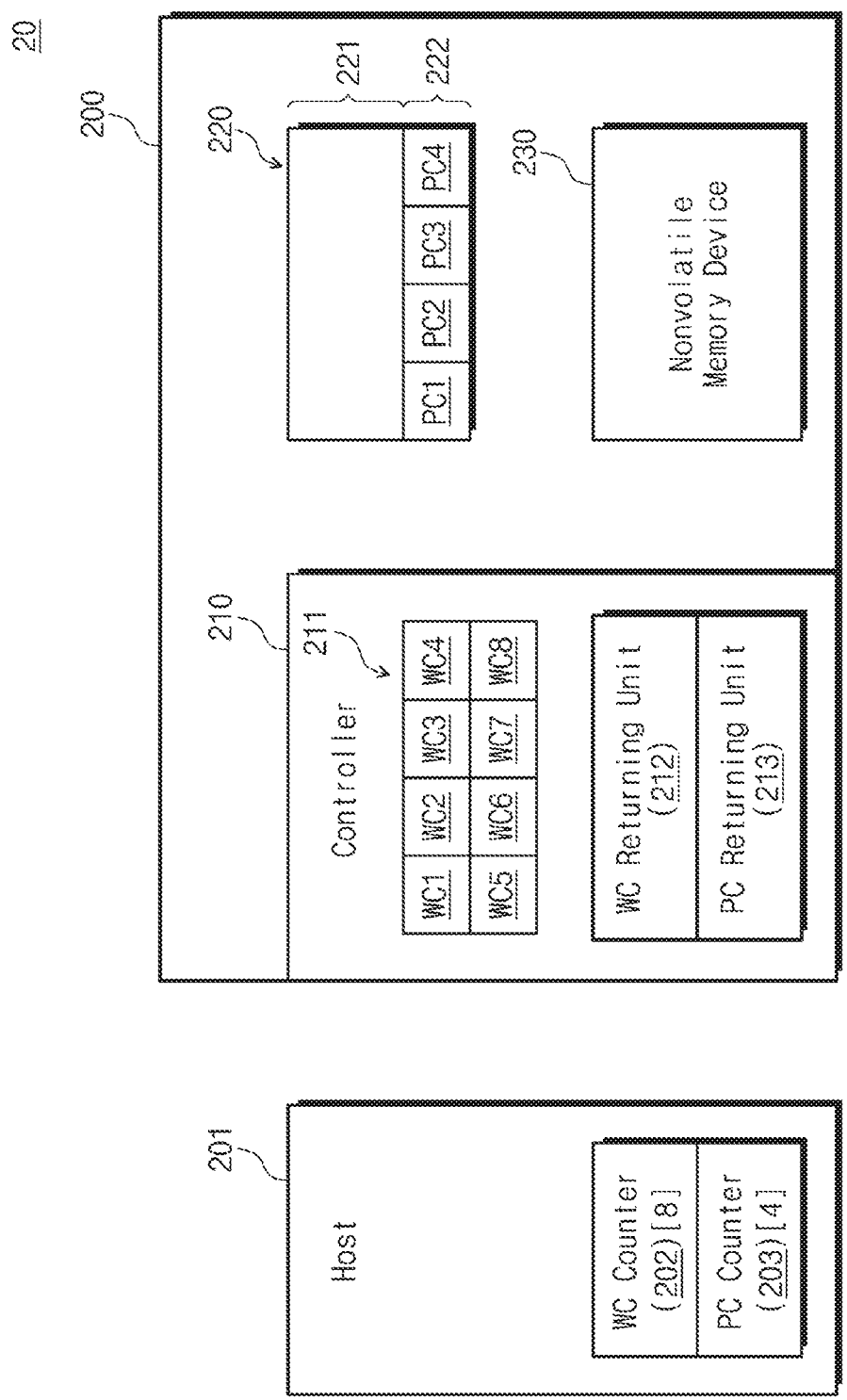
FIGS. 7A to 7D and 8 are views for describing operations of a host and a controller of FIG. 6 according to some embodiments of the present inventive concept.

For convenience of description, it is assumed that the data buffer 211 includes 8 write credits WC1 to WC8 and the second region 222 of the RAM device 220 includes 4 persist credits PC1 to PC4. That is, as illustrated in FIG. 7A, in an initial state, since the write credits WC1 to WC8 included in the data buffer 211 and the persist credits PC1 to PC4 included in the second region 222 of the RAM device 220 all are in an available state (i.e., in a released state or in a state where data are not stored), a value of the WC counter 202 may be "8", and a value of the PC counter 203 may be "4".

Figure 7B:
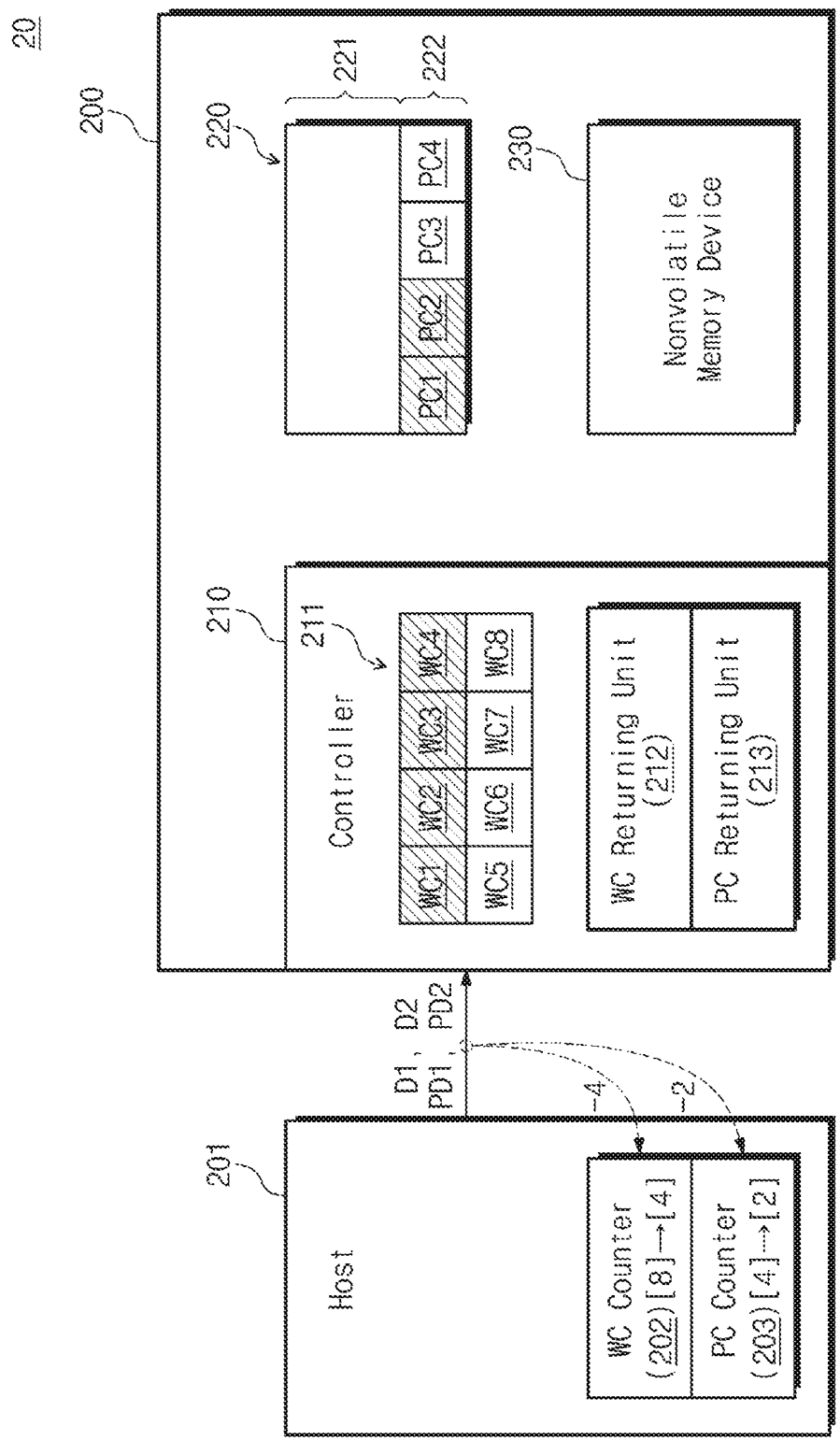

Afterwards, as illustrated in FIG. 7B, the host 201 may perform write operations on the first and second write data D1 and D2 and the first and second persist data PD1 and PD2. It is assumed that write operations for the first and second data D1 and D2 are normal write operations and write operations for the first and second persist data PD1 and PD2 are persist write operations. That is, the first and second persist data PD1 and PD2 will be stored in the second region 222 of the RAM device 220 and the nonvolatile memory device 230.

In other words, the host 201 may transmit two normal write commands and two persist write commands to the controller 210. In this case, the host 201 may decrease (or subtract) a value of the WC counter 202 based on the two normal write commands and may decrease (or subtract) a value of the WC counter 202 and a value of the PC counter 203 based on the two persist write commands. In the case where two normal write commands are transmitted to the controller 210, the host 201 may decrease the value of the WC counter 202 by "−2".

In contrast, in the case where two persist write commands are transmitted to the controller 210, the host 201 may respectively decrease the value of the WC counter 202 and the value of the PC counter 203 by "−2 since data can be transmitted by using write credits of the data buffer 211 in the case of a normal write command but persist credits of the second region 222 in the RAM device 220 are used to retain data in case of a persist write command.

As a result, in the case where two persist write commands and two persist write commands are transmitted to the controller 210, the host 201 may decrease the value of the WC counter 202 by "−4" and may decrease the value of the PC counter 203 by "−2". As such, as illustrated in FIG. 7B, the value of the WC counter 202 may be set to "4", and the value of the PC counter 203 may be set to "2".

In some example embodiments, the first and second persist data PD1 and PD2 and the first and second data D1 and D2 received from the host 201 may be first stored in the first to fourth write credits WC1 to WC4. Afterwards, some write credits of the first to fourth write credits WC1 to WC4 may be released by an operation of the controller 210.

Figure 7C:
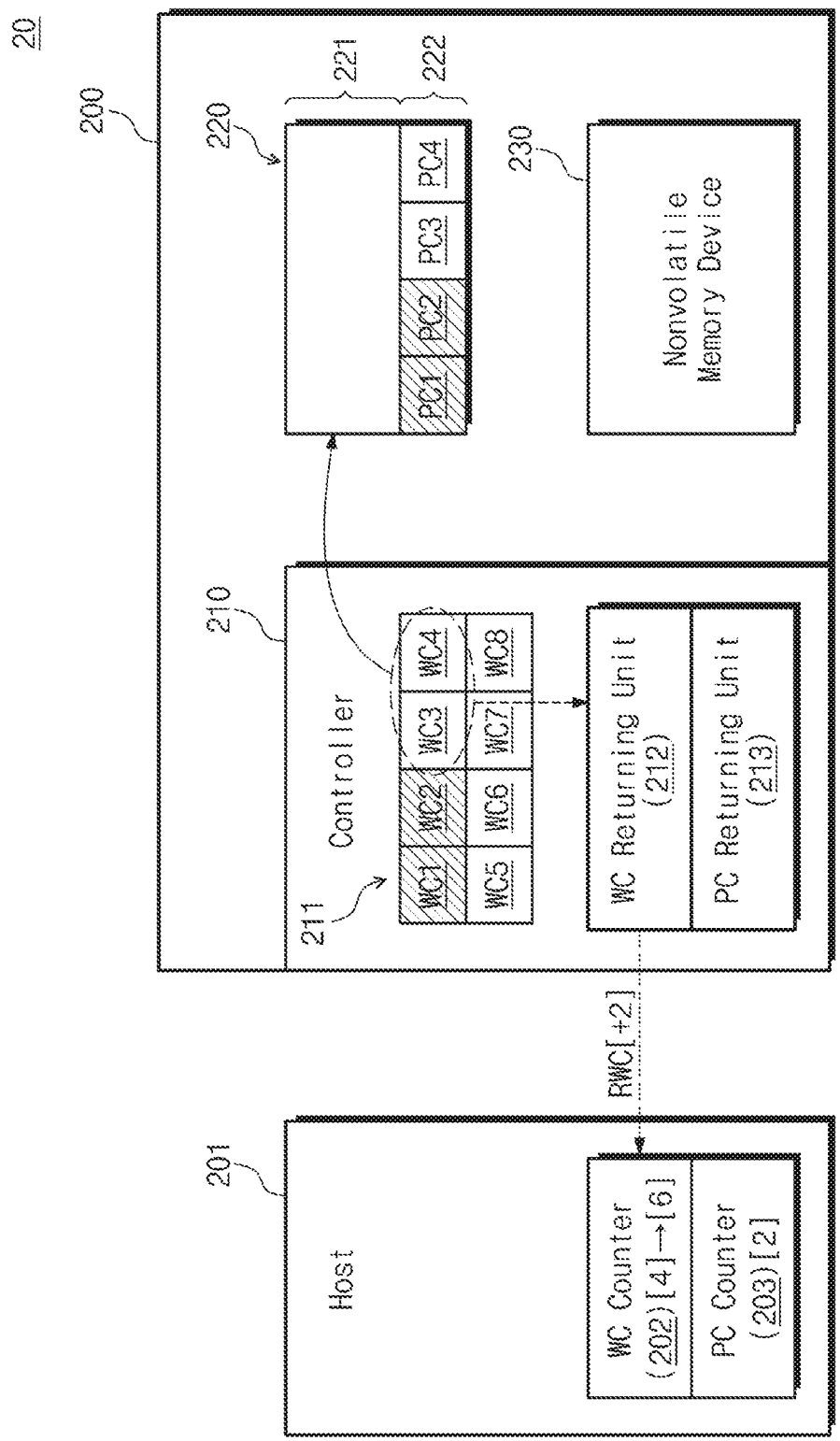

For example, as illustrated in FIG. 7C, the first and second data D1 and D2 stored in the third and fourth write credits WC3 and WC4 may be transmitted to the RAM device 220 depending on the operation of the controller 210. In this case, as described above, the third and fourth write credits WC3 and WC4 may be released.

The WC returning unit 212 may provide the host 201 with the WC release information RWC about the number of the released write credits WC3 and WC1, and the host 201 may update the WC counter 202 based on the received WC release information RWC. For example, in the above example, the WC release information RWC may correspond to a value of "+2". The host 201 may increase a value of the WC counter 202 based on the received WC release information RWC. In this case, the value of the WC counter 202 may be set to "6".

Afterwards, by the operation of the controller 210, the first and second persist data PD1 and PD2 stored in the first and second write credits WC1 and WC2 may be stored in the first and second persist credits PC1 and PC2 of the second region 222, and first and second persist data PD1 and PD2 stored in the first and second persist credits PC1 and PC2 may be stored in the nonvolatile memory device 230. In this case, the first and second persist credits PC1 and PC2 may be released.

For example, to secure the persistence of the first and second persist data PD1 and PD2, the first and second persist data PD1 and PD2 may be received from the host 201 by using the first and second persist credits PC1 and PC2. That is, the first and second persist data PD1 and PD2 may be first stored in the first and second write credits WC1 and WC2 and may be then transmitted to the first and second persist credits PC1 and PC2.

Afterwards, the first and second persist data PD1 and PD2 stored in the first and second persist credits PC1 and PC2 may be transmitted to the nonvolatile memory device 230. Since the first and second persist data PD1 and PD2 are transmitted to the nonvolatile memory device 230, the first and second persist credits PC1 and PC2, in which the first and second persist data PD1 and PD2 are stored, may be in an available state. That is, as the first and second persist data PD1 and PD2 are transmitted to the nonvolatile memory device 230, the first and second persist credits PC1 and PC2 may be released.

Figure 7D:
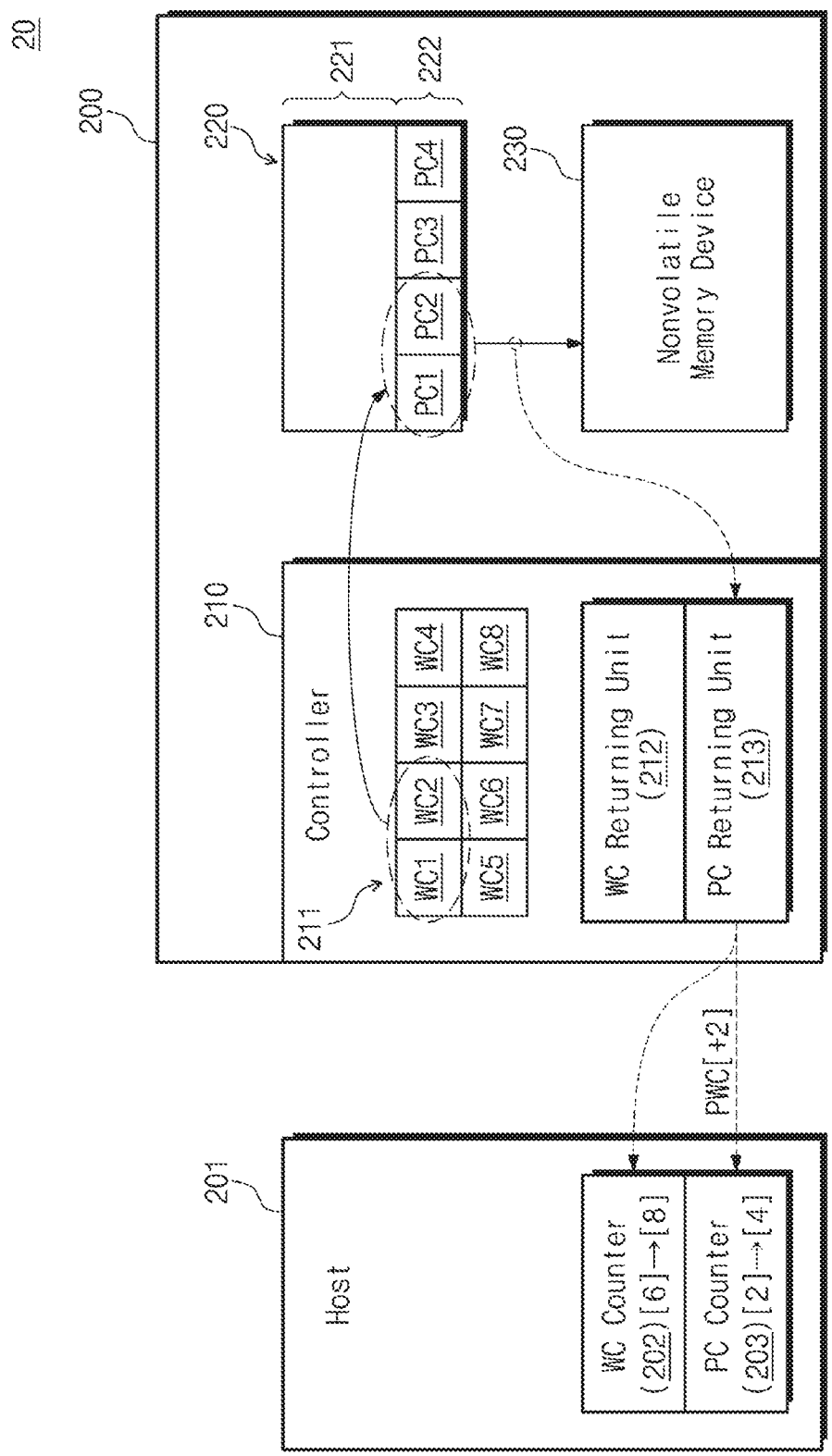

The PC returning unit 213 may provide the host 201 with the PC release information RPC, and the host 201 may update the WC counter 202 and the PC counter 203 based on the received PC release information RPC. For example, as illustrated in FIG. 7D, in the case where two persist credits PC1 and PC2 are released, the PC release information RPC may correspond to a value of "+2". In this case, the host 201 may respectively increase a value of the WC counter 202 and a value of the PC counter 203 by "+2" in response to the PC release information RPC.

Figure 8:
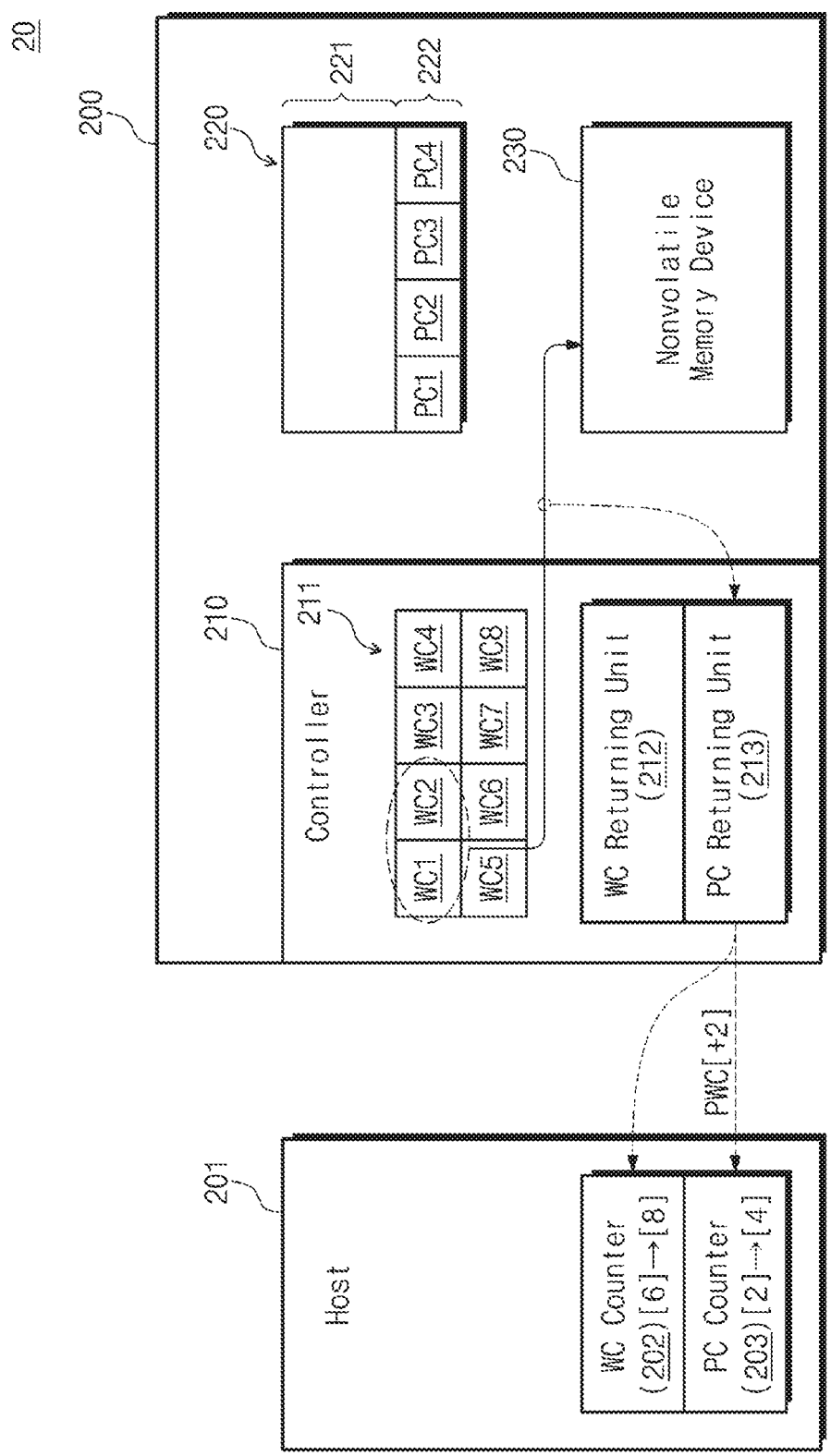

In some example embodiments, persist data for a persist write command may not be stored in both a write credit and a persist credit. For example, as illustrated in FIG. 8, the first and second persist data PD1 and PD2 for a persist write command may be stored in the first and second write credits WC1 and WC2. The first and second persist data PD1 and PD2 stored in the first and second write credits WC1 and WC2 may be transmitted to the nonvolatile memory device 230 without passing through the persist credits PC1 and PC2. In this case, the first and second persist credits PC1 and PC2 used for the first and second persist data PD1 and PD2 may be determined as being released.

That is, in the case where write data for a persist write command are stored in the nonvolatile memory device 230, the PC returning unit 213 may determine that persist credits corresponding to the write data for the persist write command are released, and the PC returning unit 213 may transmit the PC release information RPC about the number of released persist credits to the host 201. The host 201 may update the WC counter 202 and the PC counter 203 based on the received PC release information RPC.

Table 2 shows a method of updating the WC counter 202 and the PC counter 203 depending on each operation.

TABLE 2

|  | Normal write command Issuing count (m) | Persist write command Issuing count (i) | Count (n) of returned write credits | Count (k) of returned persist credits |
|---|---|---|---|---|
| Variation of WC counter | −m | −i | +n | +k |
| Variation of PC counter | 0 | −i | 0 | +k |

The host 201 may update the WC counter 202 and the PC counter 203 based on the scheme of Table 2. For example, since there is no need to secure persistence of data in the case of a normal write command, a persist credit PC is not used. Accordingly, in the case where the normal write command is issued "m" times, the host 201 may decrease a value of the WC counter 202 by "−m" but may not update the PC counter 203. There is a need to secure the persistence of data in the case of a persist write command. Accordingly, persist credits are used to secure the persistence of data, and write credits are used to transmit data. Accordingly, in the case where a persist write command is issued "i" times, the host 201 may respectively decrease a value of the WC counter 202 and a value of the PC counter 203 by "−i". In the case where "n" write credits are returned from the controller 210, since the returned write credits are used to transmit write data, the host 201 increases a value of the WC counter 202 by "+n". In the case where "k" persist credits are returned from the controller 210, the host 201 increases a value of the PC counter 203 by "+k" because the returned persist credits may be used to store write data for a persist write command. Also, the host 201 increases a value of the WC counter 202 by "+k".

Figure 9:
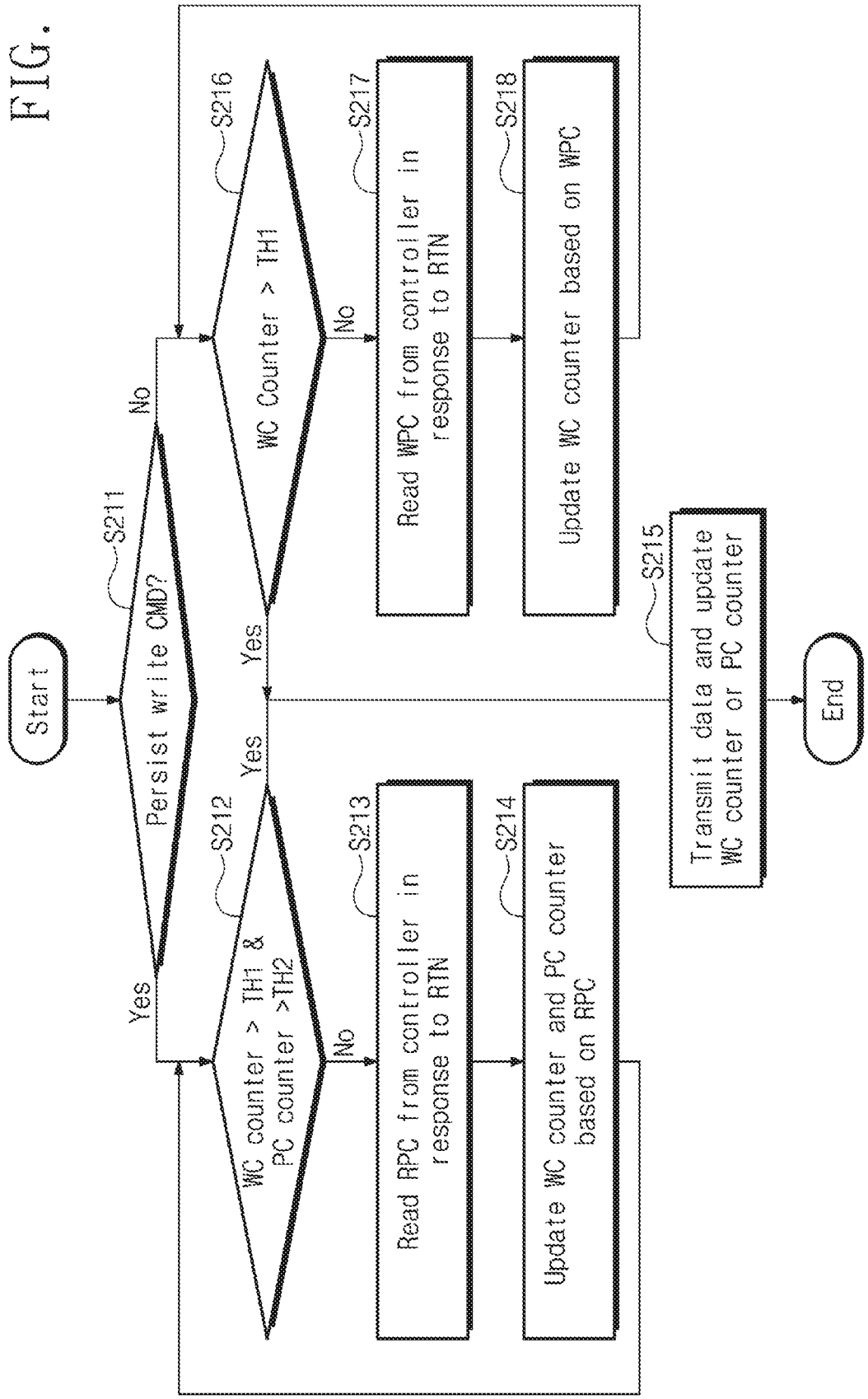
FIG. 9 is a flowchart illustrating an operation method of a host of FIG. 6 according to some embodiments of the present inventive concept.

FIG. 9 is a flowchart illustrating an operation method of the host 201 of FIG. 6. Referring to FIGS. 6 and 9, in operation S211, the host 201 may determine whether a write command to be performed is a persist write command.

In the case where the write command to be performed is the persist write command, in operation S212, the host 201 may determine whether a value of the WC counter 202 is greater than a first reference value TH1 and whether a value of the PC counter 203 is greater than a second reference value TH2. For example, each of the first reference value TH1 and the second reference value TH2 may be "0" or a positive integer that is based on an operation mode or the number of persist write commands.

In the case where the value of the WC counter 202 is not greater than the first reference value TH1 or the value of the PC counter 203 is not greater than the second reference value TH2, the host 201 cannot perform an operation associated with the persist write command. The reason is that write credits WC or persist credits PC necessary to perform the persist write command is insufficient. In this case, in operation S213, the host 201 may read the PC release information RPC from the controller 214. A way to receive the PC release information RPC is similar to a way to receive the WC release information RWC, which is described above, and thus, will not be repeated here.

In operation S214, the host 201 may update the WC counter 202 and the PC counter 203, based on the received PC release information RPC. A way to update the WC counter 202 and the PC counter 203, based on the received PC release information RPC is described with reference to FIGS. 7A to 7D and 8 and Table 2, and thus, a detailed description thereof will not be repeated here. After operation S214, the controller 210 may perform operation S212.

In the case where the value of the WC counter 202 is greater than the first reference value TH1 and the value of the PC counter 203 is greater than the second reference value TH2, in operation S215, the host 201 may transmit write data to the controller 210 and may update the WC counter 202 and the PC counter 203.

In the case where the determination result of operation S211 indicates that the write command to be performed is not the persist write command, the host 201 may perform one or more operation S216 to operation S218. Operation S216 to operation S218 may be similar to operation S111 to operation S113 of FIG. 3, and thus, a detailed description thereof will not be repeated here.

Figure 10:
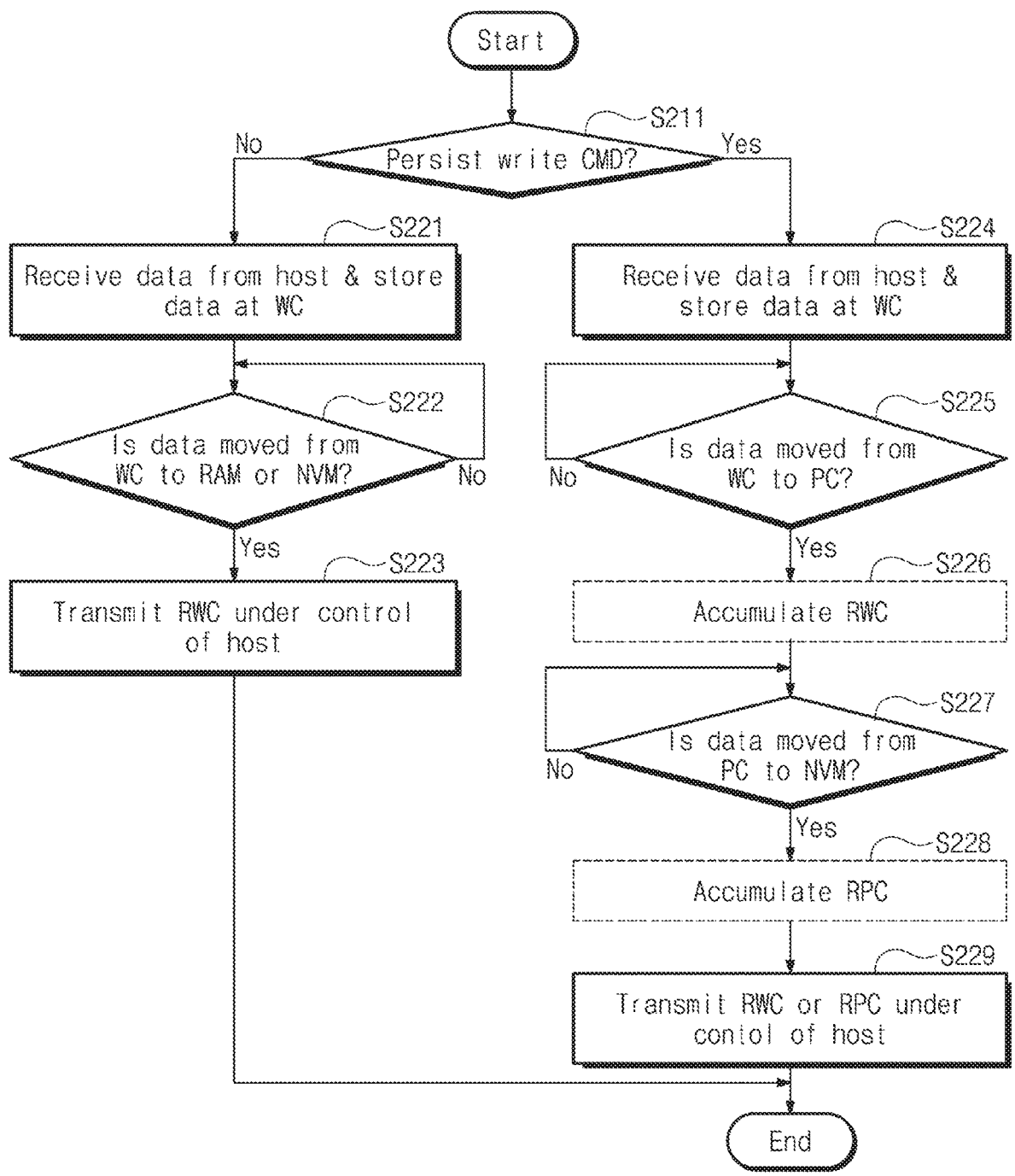
FIG. 10 is a flowchart illustrating an operation method of a memory module of FIG. 6 according to some embodiments of the present inventive concept.

FIG. 10 is a flowchart illustrating an operation method of the memory module 200 of FIG. 6. Referring to FIGS. 6 and 10, in operation S221, the memory module 200 may determine whether a command received from the host 201 is a persist write command. In the case where the received command is not the persist write command (i.e., in the case where the received command is a normal write command), the memory module 200 may perform operation S221 to operation S223. Operation S221 to operation S223 are similar to operation S121 to operation S123 of FIG. 4, and thus, a detailed description thereof will not be repeated here.

In the case where the received command is the persist write command, the memory module 200 may perform one or more of operation S224 to operation S229. In operation S224, the memory module 200 may receive data from the host 201 and may store the received data in a write credit WC.

In operation S225, the memory module 200 may determine whether data are moved from a write credit WC to a persist credit PC. That is, the memory module 200 may determine whether a write credit WC is released.

In the case where data are moved from a write credit WC to a persist credit PC, in operation S226, the memory module 200 may accumulate the WC release information RWC.

In operation S227, the memory module 200 may determine whether data are moved from a persist credit PC to the nonvolatile memory device 230. That is, the memory module 200 may determine whether a persist credit PC is released.

In the case where data are moved from a persist credit PC to the nonvolatile memory device 230, the memory module 200 may accumulate the PC release information RPC.

In operation S229, the memory module 200 may transmit the WC release information RWC or the PC release information RPC to the host 201 under control of the host 201.

In some example embodiments, operation S226 or operation S228 may be omitted depending on a way to transmit the WC release information RWC or the PC release information RPC. For example, in the case of a way for the memory module 200 to provide the return signal RTN to the host 201 whenever a write credit WC is released or a persist credit PC is released, operation S226 or operation S228 may be omitted.

The operation method according to the above-described flowchart represent example embodiments, and the inventive concept is not limited thereto. The operation method of the memory module 200 according to the inventive concept may be changed or modified without departing from the scope and spirit of the inventive concept.

Figure 11:
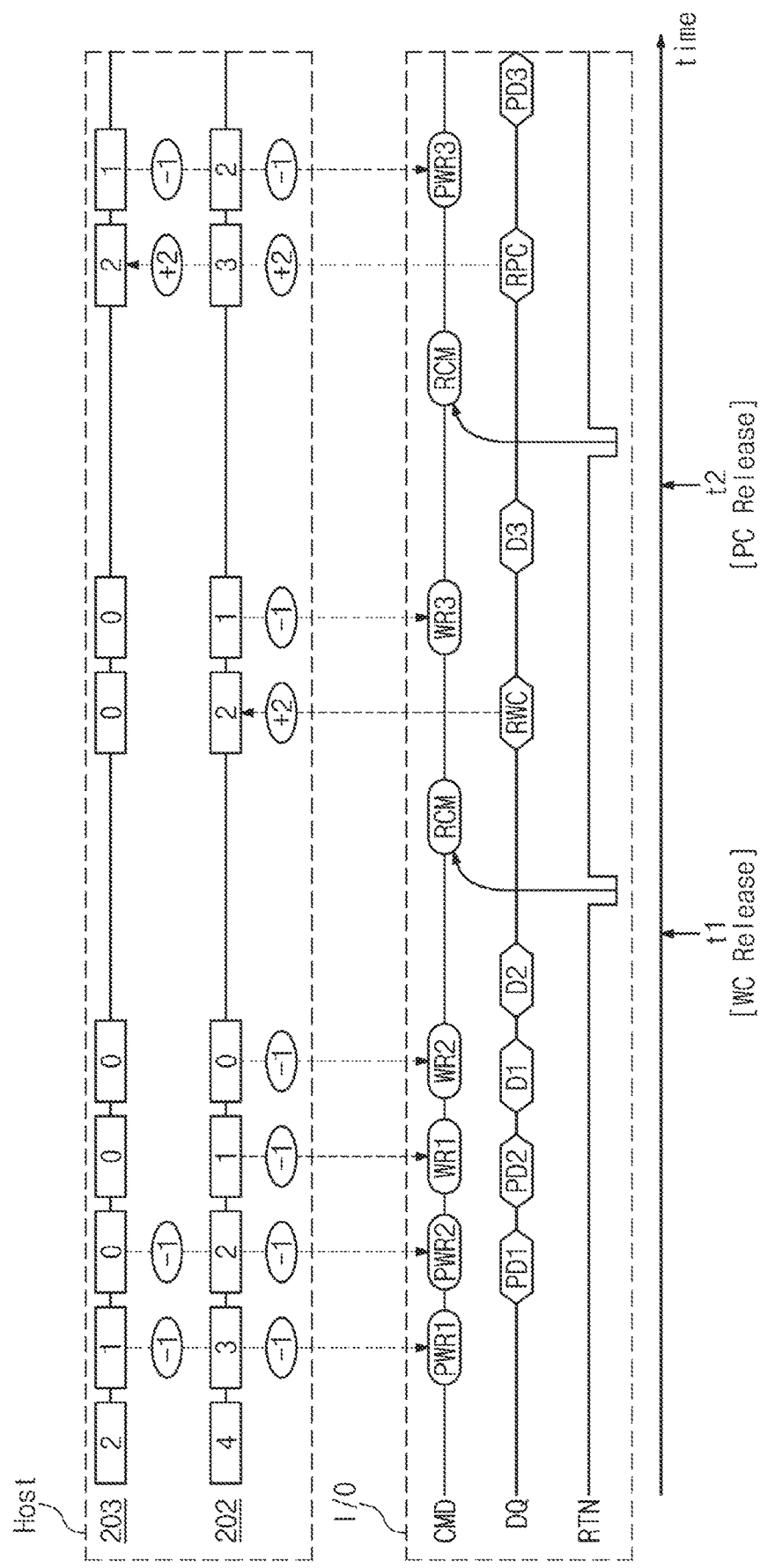
FIG. 11 is a timing diagram for describing operations of a host and a controller of FIG. 6 according to some embodiments of the present inventive concept.

FIG. 11 is a timing diagram for describing operations of the host 201 and the controller 210 of FIG. 6. Referring to FIGS. 6 and 11, in an initial state, a value of the WC counter 202 may be "4", and a value of the PC counter 203 may be "2". This means that the number of write credits WC available by the host 201 is "4" and the number of persist credits PC available by the host 201 is "2".

The host 201 may perform a persist write operation or a normal write operation based on the WC counter 202 and the PC counter 203. For example, the host 201 may transmit, to the controller 210, first and second persist write commands PWR1 and PWR2 and first and second persist data PD1 and PD2 corresponding to the first and second persist write commands PWR1 and PWR2.

As described above, the host 201 may respectively decrease a value of the WC counter 202 and a value of the PC counter 203 in response to the first and second persist write commands PWR1 and PWR2. That is, the host 201 may respectively decrease the value of the WC counter 202 and the value of the PC counter 203 by "−1" after transmitting the first persist write command PWR1. The host 201 may respectively decrease the value of the WC counter 202 and the value of the PC counter 203 by "−1" after transmitting the second persist write command PWR2.

The value of the PC counter 203 may be "0" at a time point when the second persist write command PWR2 is transmitted. In this case, since a persist credit PC available by the host 201 does not exist, the host 201 may not perform a persist write operation. In contrast, since the value of the WC counter 202 is "2", the host 201 may perform a normal write operation. That is, the host 201 may transmit, to the controller 210, first and second write commands WR1 and WR2 and first and second data D1 and D2 corresponding to the first and second write commands WR1 and WR2.

At a time point when the second write command WR2 is transmitted, since the values of the WC counter 202 and the PC counter 203 are "0", the host 201 may not perform a write operation or data transmission.

At a first time point t1, as described above, some write credits may be released by an operation of the controller 210. In this case, the controller 210 may transmit the return signal RTN to the host 201. Also the return signal RTN is illustrated as being active low, the inventive concepts are not limited hereto.

The host 201 may transmit the return command RCM to the controller 210 in response to the return signal RTN, and the controller 210 may transmit the WC release information RWC in response to a read command RD. It is assumed that the WC release information RWC corresponds to a value of "+2". The host 201 may increase a value of the WC counter 202 by "+2" in response to the received WC release information RWC.

At a time point when the WC release information RWC is received, the value of the WC counter 202 is "2", the host 201 may perform a normal write operation. As such, the host 201 may transmit, to the controller 210, a third write command WR3 and third data D3 corresponding to the third write command WR3. As the third write command WR3 is transmitted to the controller 210, the host 201 may decrease the value of the WC counter 202 by At a second time point t2, some persist credits may be released by an operation of the controller 210. For example, as described above, as the first and second persist data PD1 and PD2 associated with the first and second persist write commands PWR1 and PWR2 are stored in the nonvolatile memory device 230, two persist credits may be released. In this case, the controller 210 may transmit the return signal RTN to the host 201, and the host 201 may transmit the return command RCM to the controller 210 in response to the return signal RTN. The controller 210 may transmit the PC release information RPC to the host 201 in response to the return command RCM.

The host 201 may update the WC counter 202 and the PC counter 203 based on the received PC release information RPC. For example, in the case where the PC release information RPC indicates that two persist credits PC are released, the host 201 may respectively update the WC counter 202 and the PC counter 203 by "+2" based on the received PC release information RPC.

At a time point when the PC release information RPC is received, since the value of the WC counter 202 is "3" and the value of the PC counter 203 is "2", the host 201 may perform a persist write operation or a normal write operation. For example, the host 201 may transmit, to the controller 210, a third persist write command PWR3 and third persist data PD3 corresponding to the third persist write command PWR3. As the third persist write command PWR3 is transmitted to the controller 210, the host 201 may decrease the value of the WC counter 202 and the value of the PC counter 203 by "−1", respectively.

As described above, the host 201 according to the inventive concept may manage a buffer resource of the memory module 200 by updating the WC counter 202 and the PC counter 203 depending on a persist write operation or a normal write operation. Also, the host 201 may update the WC counter 202 and the PC counter 203 based on the WC release information RWC and the PC release information RPC returned from the controller 210.

In some example embodiments, a way to transmit the WC release information RWC and the PC release information RPC may be variously implemented. For example, as in the description given with reference to FIGS. 6 and 7, the WC returning unit 212 and the PC returning unit 213 may respectively accumulate WC release information and PC release information based on a released write credit(s) and a released persist credit(s), and may transmit the accumulated information in response to a return command or a read command from the host 201.

Figure 12A:
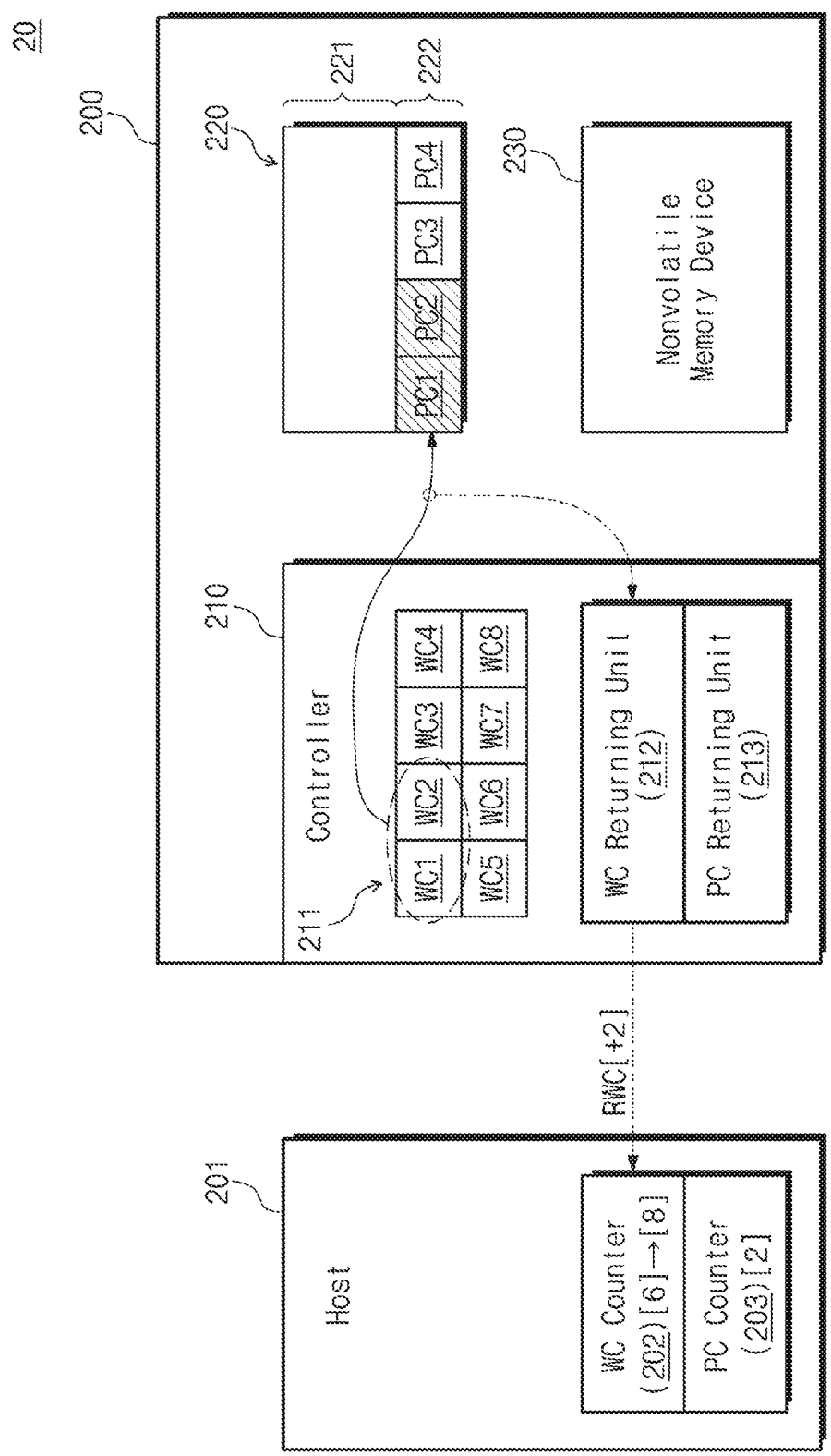
FIGS. 12A and 12B are block diagrams for describing operations of a host and a controller of FIG. 6 according to some embodiments of the present inventive concept.
Figure 12B:
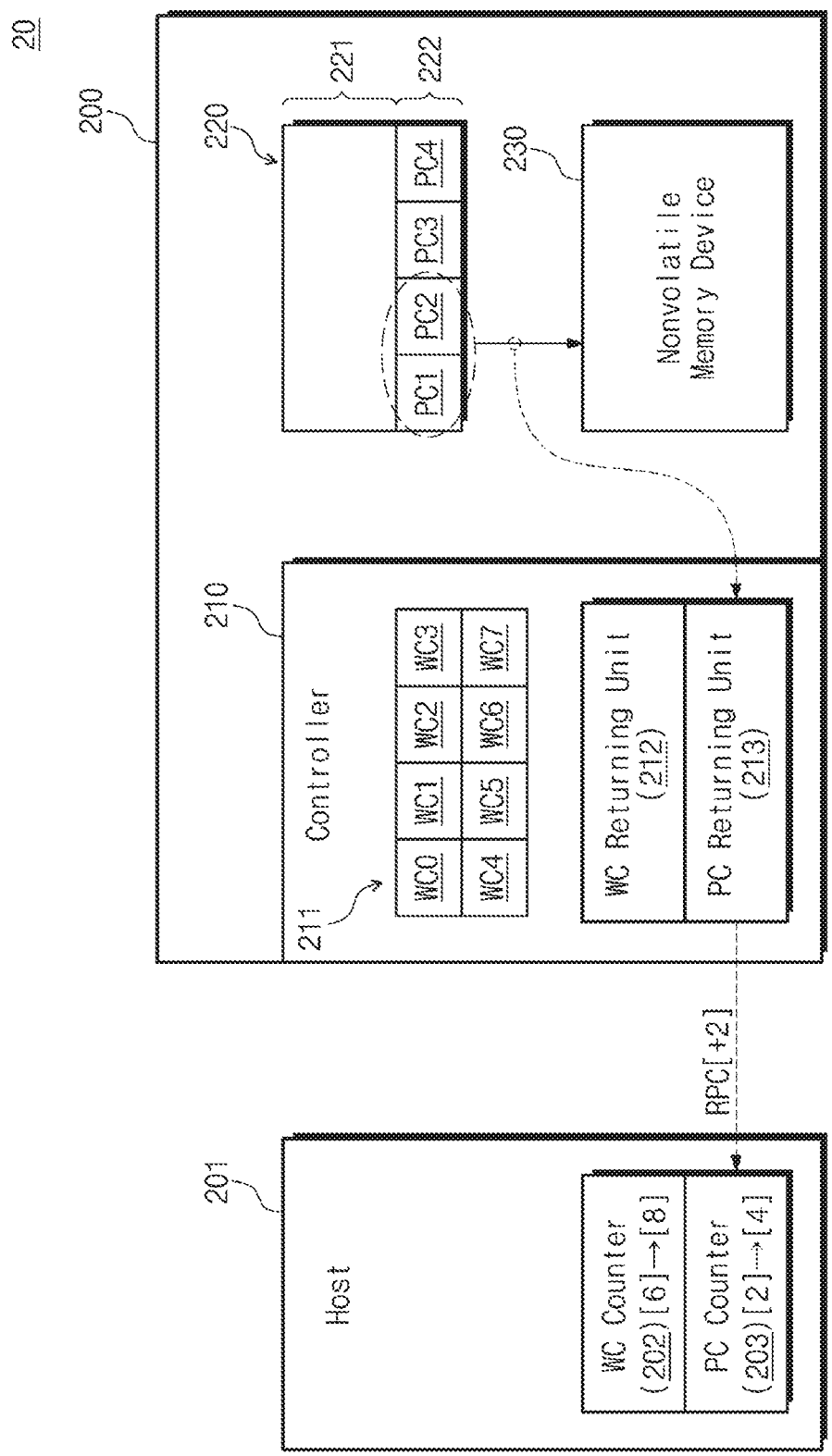

FIGS. 12A and 12B are block diagrams for describing operations of the host 201 and the controller 210 of FIG. 6. For a brief description, a detailed description associated with components that are unnecessary in each operation will not be repeated here.

Referring to FIGS. 12A and 12B, the computing system 20 may include the host 201 and the memory module 200. The host 201 may include the WC counter 202 and the PC counter 203. The memory module 200 may include the controller 210, the RAM device 220, and the nonvolatile memory device 230.

For convenience of description, it is assumed that first write credits WC1 and WC2 and first and second persist credits PC1 and PC2 are used through a persist write operation of the host 201. That is, before a configuration illustrated in FIG. 12A, a value of the WC counter 202 may be "6", and a value of the PC counter 203 may be "2". Afterwards, as illustrated in FIG. 12A, write data stored in the first and second write credits WC1 and WC2 may be stored in the first and second persist credits PC1 and PC2 depending on an operation of the controller 210. In this case, the first and second write credits WC1 and WC2 may be released.

The WC returning unit 212 may provide the host 201 with the WC release information RWC about the released write credits WC1 and WC2, and the host 201 may update the WC counter 202 based on the received WC release information RWC. In the embodiment of FIG. 12A, since the number of released write credits is "2", the host 201 may increase the value of the WC counter 202 by "+2".

Afterwards, as illustrated in FIG. 12B, write data stored in the first and second persist credits PC1 and PC2 may be stored in the nonvolatile memory device 230 depending on an operation of the controller 210. In this case, the first and second persist credits PC1 and PC2 may be released.

The PC returning unit 213 may provide the host 201 with the PC release information RPC about the released persist credits PC1 and PC2, and the host 201 may update the PC counter 203 based on the received PC release information RPC. In the embodiment of FIG. 12B, since the number of released persist credits is "2", the host 201 may increase the value of the PC counter 203 by "+2".

As described above, the host 201 may manage write credits WC and persist credits PC of the memory module 200 separately, and may individually update the WC counter 202 and the PC counter 203 based on the WC release information RWC and the PC release information RPC received from the controller 210. Table 3 shows a method of updating the WC counter 202 and the PC counter 203 according to the embodiments of FIGS. 12A and 12B.

counter based on the number of returned persist credits. However, in the embodiments described with reference to FIGS. 12A and 12B and Table 3, the host 201 may be configured to update only the WC counter 202 based on the WC release information RWC and to update only the PC counter 203 based on the PC release information RPC. That is, the host 201 may respectively manage the WC counter 202 and the PC counter 203 based on the WC release information RWC and the PC release information RPC.

FIGS. 13A to 13D are timing diagrams for describing operations of the host 201 and the controller 210 according to an embodiment of FIGS. 12A and 12B. For convenience of description, a description that is same as given with reference to the above-described components will not be repeated here.

Figure 13A:
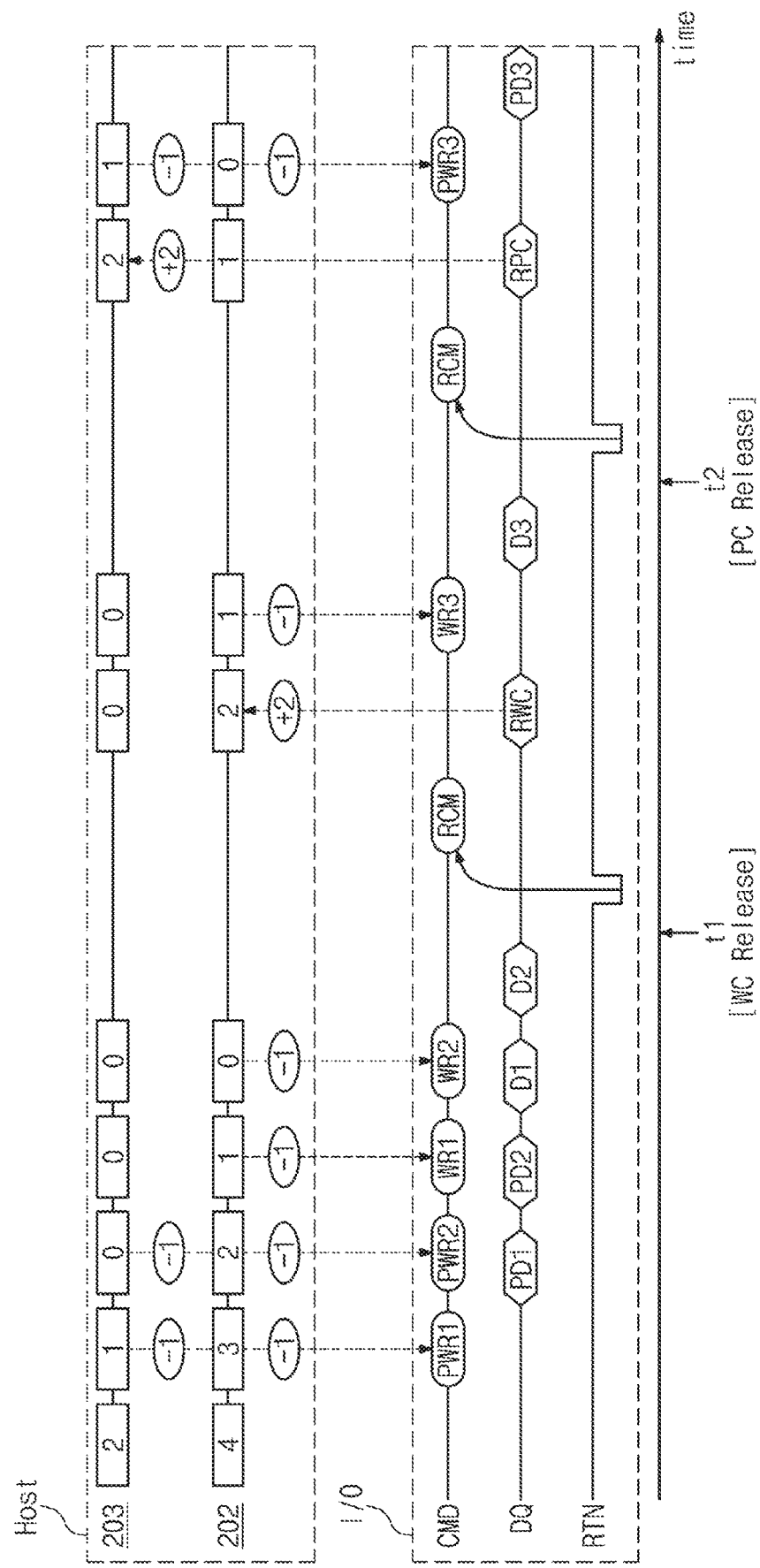
FIGS. 13A to 13D are timing diagrams for describing operations of a host and a controller according to an embodiment of FIGS. 12A and 12B.

Referring to FIGS. 6 and 13A, initially, a value of the WC counter 202 may be "4", and a value of the PC counter 203 may be "2". An operation from a time point when the host 201 transmits a first persist write command PWR1 to a second time point t2 is similar to the operation described with reference to FIG. 11, and thus, a detailed description thereof will not be repeated here. At a second time point t2, some persist credits may be released by an operation of the controller 210. The controller 210 may transmit the return signal RTN to the host 201. The host 201 may transmit the return command RCM to the controller 210 in response to the return signal RTN, and the controller 210 may transmit the PC release information RPC in response to the return command RCM.

Unlike the description given with reference to FIG. 11, based on the received PC release information RPC, the host 201 may not update the WC counter 202 and may update only the PC counter 203. For example, write credits released at the first time point t1 may be write credits released as the controller 210 transmits the first and second persist data PD1 and PD2 from write credits to persist credits. Persist credits released at the second time point t2 may be persist credits released as the controller 210 transmits the first and second persist data PD1 and PD2 from persist credits to the nonvolatile memory device 230. Accordingly, as described with reference to Table 3, the host 201 may update only the PC counter 203 based on the PC release information RPC.

TABLE 3

|  | Normal write command Issuing count (m) | Persist write command Issuing count (i) | Count (n) of returned write credits | Count (k) of returned persist credits |
|---|---|---|---|---|
| Variation of WC counter | −m | −i | +n | 0 |
| Variation of PC counter | 0 | −i | 0 | +k |

Referring to Table 3, a configuration associated with generating a normal write command and a persist write command is the same as a configuration of Table 2, and thus, a description thereof will not be repeated here. In the case where the number of write credits WC returned from the controller 210 is "n", the host 201 may increase a value of the WC counter 202 by "+n". In this case, the variation of the PC counter 203 may be "0". In the case where the number of persist credits PC returned from the controller 210 is "k", the host 201 may increase a value of the PC counter 203 by "+k". In this case, the variation of the WC counter 202 may be "0". That is, in the embodiments described with reference to FIGS. 7A to 7D and 8 and Table 2, the host 201 may update both a WC counter and a PC Next, in FIGS. 13B to 13D, the host 201 may transmit, to the controller 210, first and second persist write commands PWR1 and PWR2, first and second persist data PD1 and PD2 corresponding to the first and second persist write commands PWR1 and PWR2, first and second normal write commands WR1 and WR2, and first and second data D1 and D2 corresponding to the first and second normal write commands WR1 and WR2.

As in the embodiment described with reference to FIGS. 6 and 7, the WC returning unit 212 may accumulate the WC release information RWC whenever write credits, in which the first and second persist data PD1 and PD2 and the first and second data D1 and D2 are stored, are respectively released. Also, the PC returning unit 213 may accumulate the PC release information whenever a persist credit is released.

For example, at first to fourth time points t1 to t4, the first and second persist data PD1 and PD2 may be moved from write credits to persist credits, and the first and second data D1 and D2 may be moved from write credits to the first region 221 of the RAM device 220 or to the nonvolatile memory device 230. In this case, at each time point, a write credit is released, and thus, the WC returning unit 212 may accumulate the WC release information RWC by "+1".

Also, at the second and third time points t2 and t3, the first and second persist data PD1 and PD2 stored in persist credits may be transmitted to the nonvolatile memory device 230. In this case, at each of the second and third time points t2 and t3, a persist credit is released, and thus, the PC returning unit 213 accumulates the PC release information RPC by "+1". As a result, at the fourth time point t4, the accumulated WC release information RWC and the accumulated PC release information RPC may be "4" and "2", respectively.

Figure 13B:
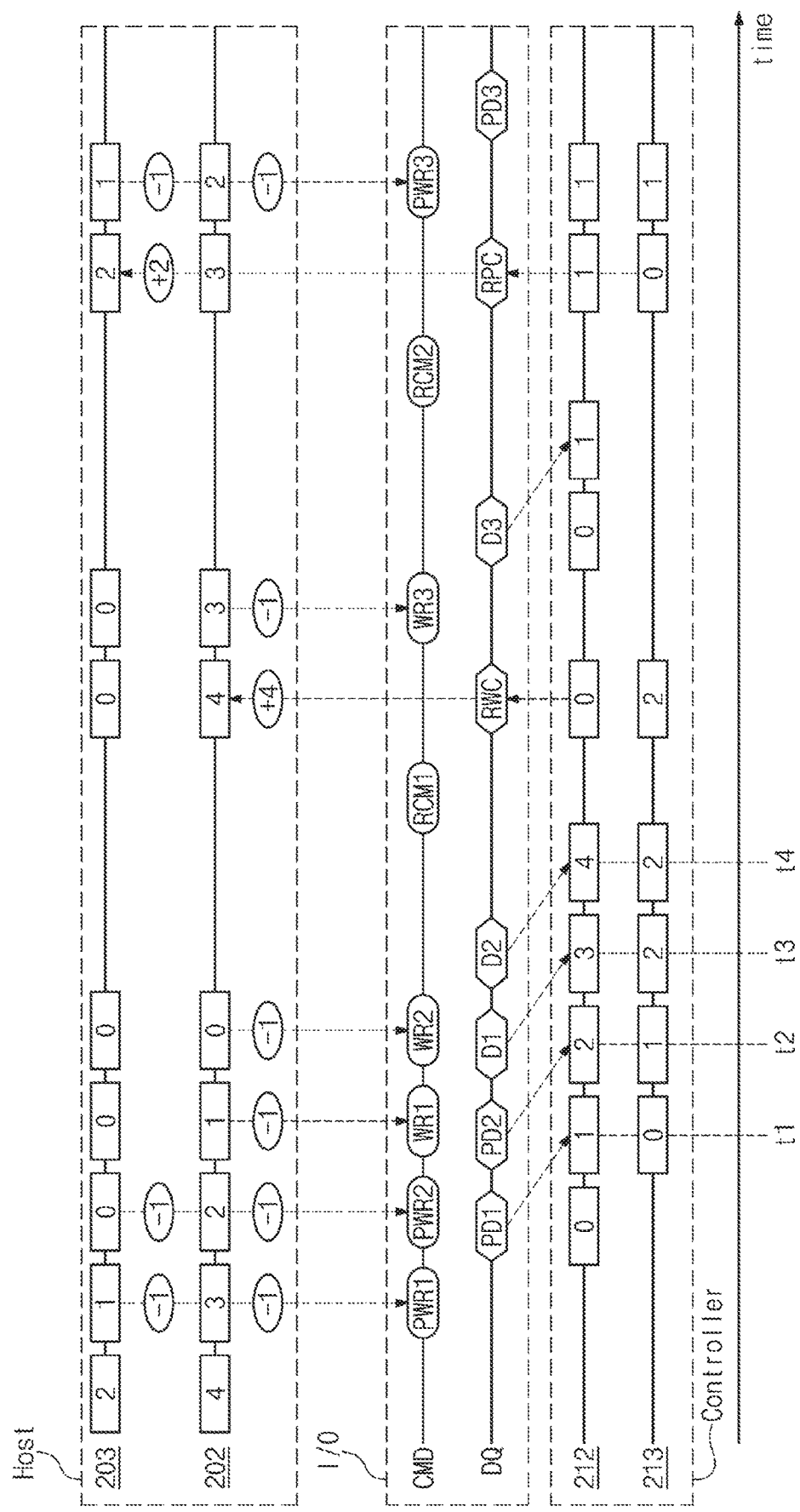

In FIG. 13B, the controller 210 may receive a first return command RCM1 from the host 201. The first return command RCM1 may be a command that the host 201 transmits to the controller 210 for the purpose of securing available write credits.

The controller 210 may transmit the WC release information RWC to the host 201 in response to the first return command RCM1, and the host 201 may update the WC counter 202 based on the received WC release information RWC.

The host 201 may transmit a third normal write command WR3 and third data D3. Afterwards, the host 201 may transmit a second return command RCM2 to the controller 210. The second return command RCM2 may be a command that the host 201 transmits to the controller 210 for the purpose of securing available persist credits.

The controller 210 may transmit the PC release information RPC to the host 201 in response to the second return command RCM2, and the host 201 may update the PC counter 203 based on the received PC release information RPC.

Figure 13C:
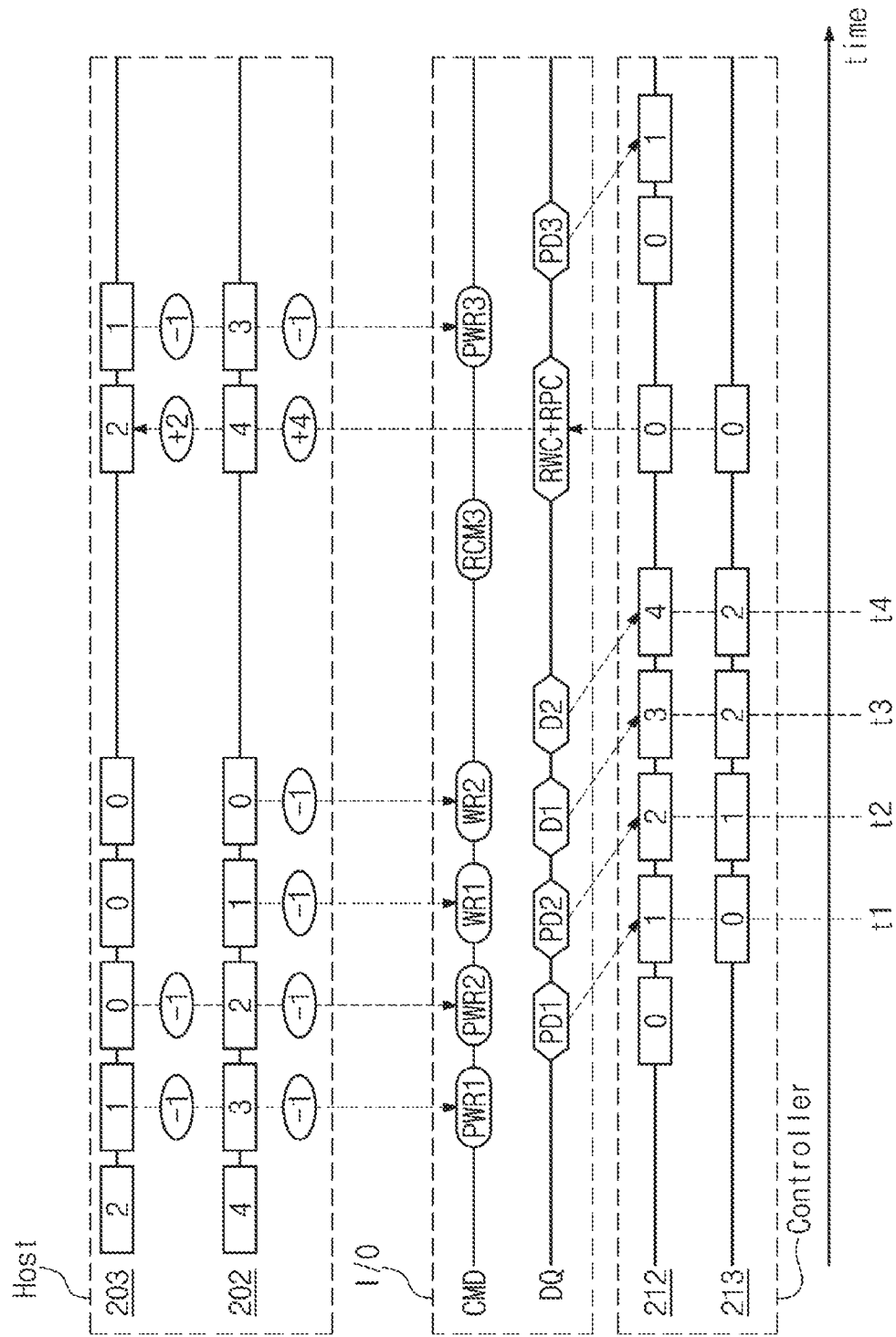

Then, referring to FIG. 13C, the host 201 may transmit a third return command RCM3 to the controller 210. Unlike the first and second return commands RCM1 and RCM2, the third return command RCM3 may be a command that the host 201 transmits to the controller 210 for the purpose of securing both available write credits and available persist credits.

The controller 210 may transmit the WC release information RWC and the PC release information RPC to the host 201 in response to the third return command RCM3, and the host 201 may update the WC counter 202 and the PC counter 203 based on the received WC release information RWC and the received PC release information RPC.

Figure 13D:
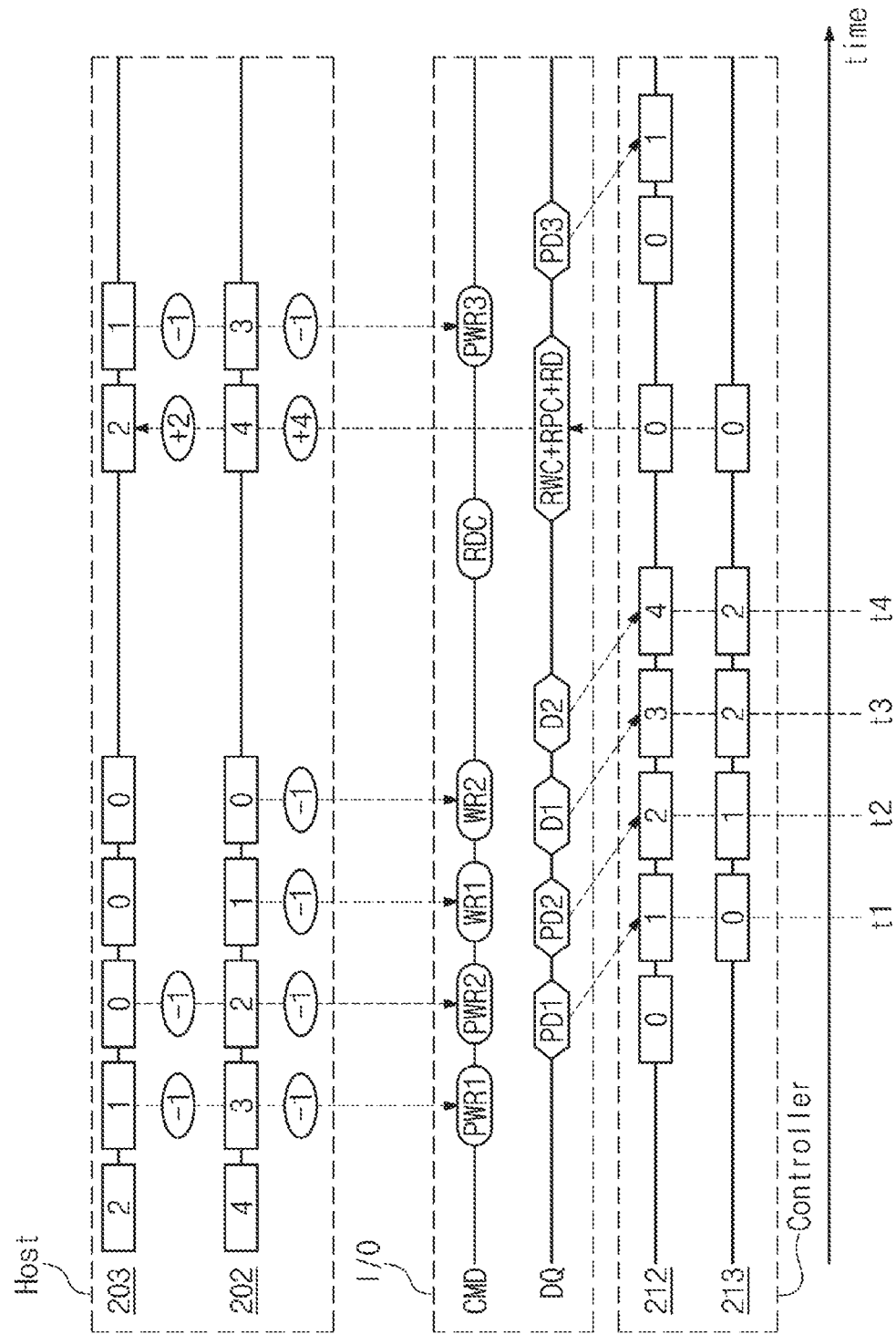

After that, referring to FIG. 13D, the host 201 may transmit a read command RDC to the controller 210. The controller 210 may transmit read data RD to the host 201 in response to the read command RDC. In this case, when accumulated WC release information and accumulated PC release information exist, the controller 210 may transmit the WC release information RWC and the PC release information RPC to the host 201 together with the read data RD, and the host 201 may respectively update the WC counter 202 and the PC counter 203 based on the received WC release information RWC and the received PC release information RPC.

As described above, the WC returning unit 212 and the PC returning unit 213 of the controller 210 may respectively accumulate the WC release information RWC and the PC release information RPC depending on a release of a write credit and a persist credit, and may transmit the accumulated information to the host 201 in response to a return command or a read command from the host 201.

Figure 14:
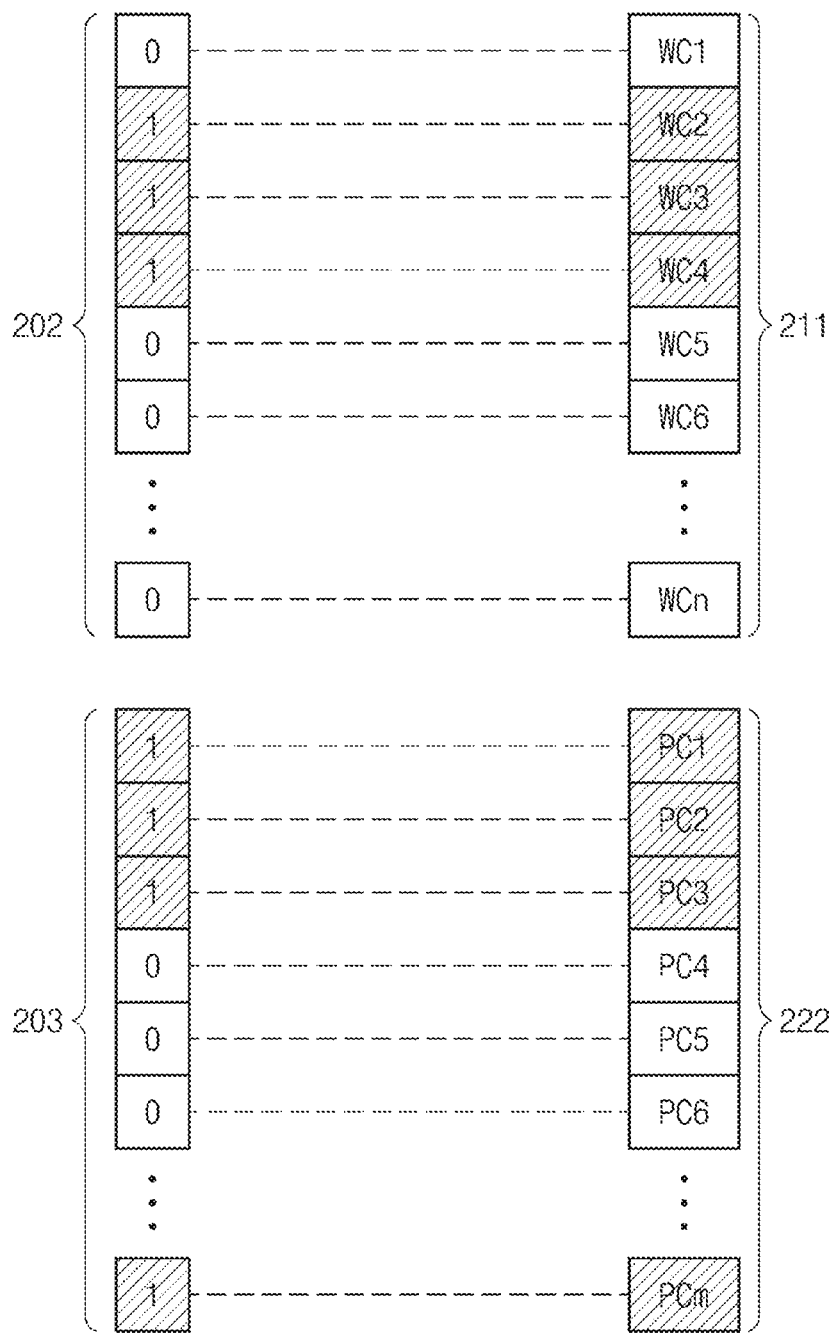
FIG. 14 is a view illustrating an example of a write credit (WC) counter and a persist credit (PC) counter of FIG. 6 according to some embodiments of the present inventive concept.

FIG. 14 is a view illustrating an example of the WC counter 202 and the PC counter 203 of FIG. 6. For example, in the above-described embodiments, the WC counter 102 or 202 may be configured to manage the number of available write credits of write credits of the controller 110 or 210, and the PC counter 203 may be configured to manage the number of available persist credits of persist credits of the controller 210.

However, the inventive concept is not limited thereto. For example, as illustrated in FIG. 14, each of the WC counter 202 and the PC counter 203 may be implemented in the form of a bitmap. For example, the WC counter 202 may be implemented in the form of a bitmap, and bits of the bitmap may correspond to a plurality of write credits WC1 to WCn of the data buffer 211, respectively. In a write operation, the host 201 may manage used write credits and available write credits by changing a value of a bit corresponding to a used write credit.

Likewise, the PC counter 203 may be implemented in the form of a bitmap, and bits of the bitmap may correspond to a plurality of persist credits PC1 to PCm of the second region 222 of the RAM device 220, respectively. In a write operation, the host 201 may manage used persist credits and available persist credits by changing a value of a bit corresponding to a used persist credit.

The above-described configurations of the WC counter and the PC counter of a bitmap form are examples, and the inventive concept is not limited thereto. The configurations of the WC counter and the PC counter may be changed or modified without departing from the scope and spirit of the inventive concept.

Figure 15:
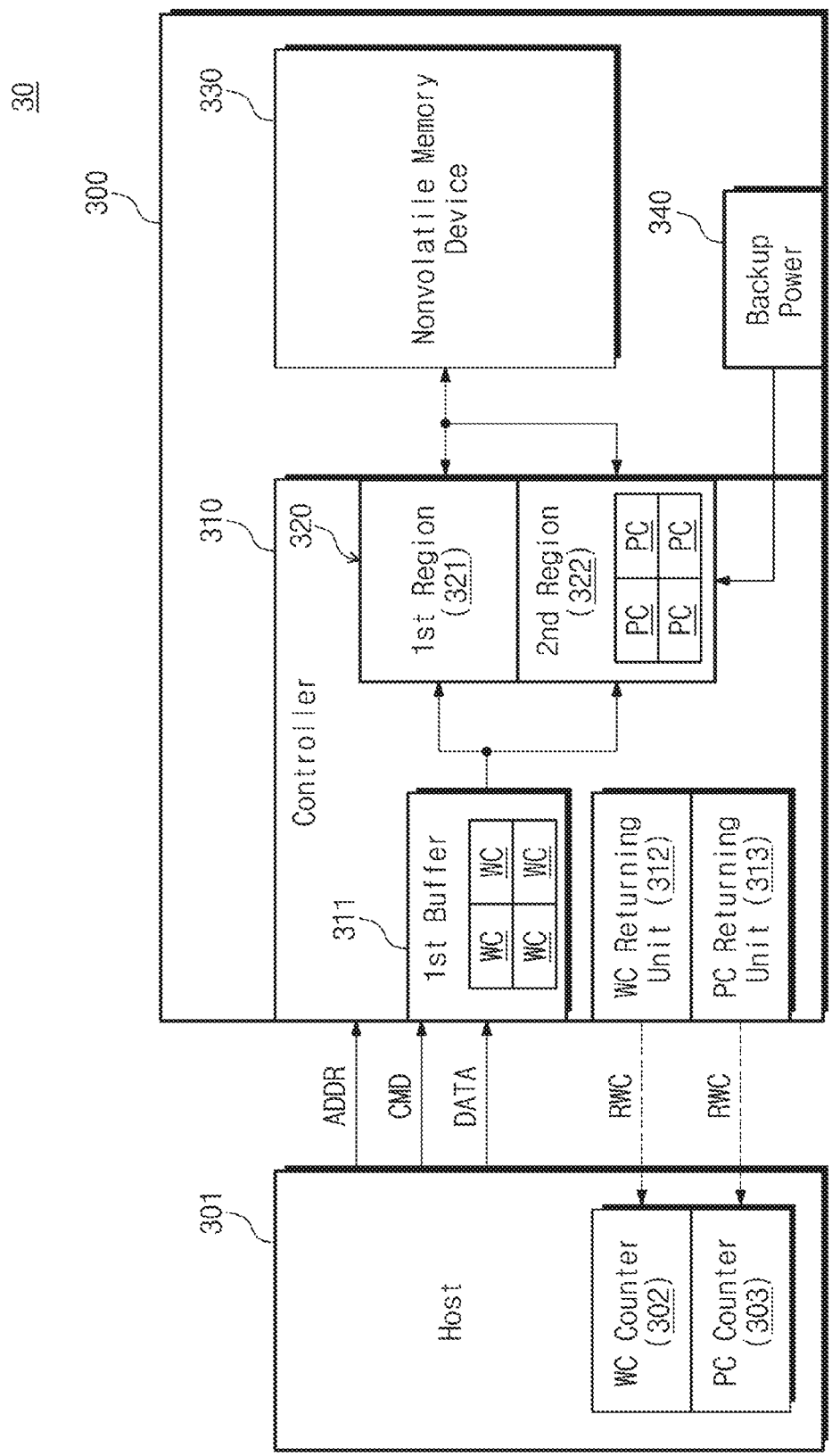
FIG. 15 is a block diagram illustrating a computing system according to some embodiments of the present inventive concept.

FIG. 15 is a block diagram illustrating a computing system 30 according to some embodiments of the inventive concept. Referring to FIG. 15, the computing system 30 may include a host 301 and a memory module 300. The host 301 may include a WC counter 302 and a PC counter 303. The memory module 300 may include a controller 310, a nonvolatile memory device 330, and a backup power 340. The controller 310 may include a first buffer 311, a WC returning unit 312, a PC returning unit 313, and a second buffer 320. The second buffer 320 may include a first region 321 and a second region 322. Components of FIG. 15 is described above, and thus, a detailed description thereof will not be repeated here.

For example, the first buffer 311 may correspond to the above-described data buffer, and the second buffer 320 may correspond to the above-described RAM device. For example, the first buffer 311 may include the above-described write credits WC, and the second buffer 320 (in particular, the second region 322) may include persist credits PC. That is, FIG. 15 shows a configuration in which the second buffer 320 is included in the controller 310. As described above, the controller 310 may include persist credits PC and may operate as in the above description.

Figure 16:
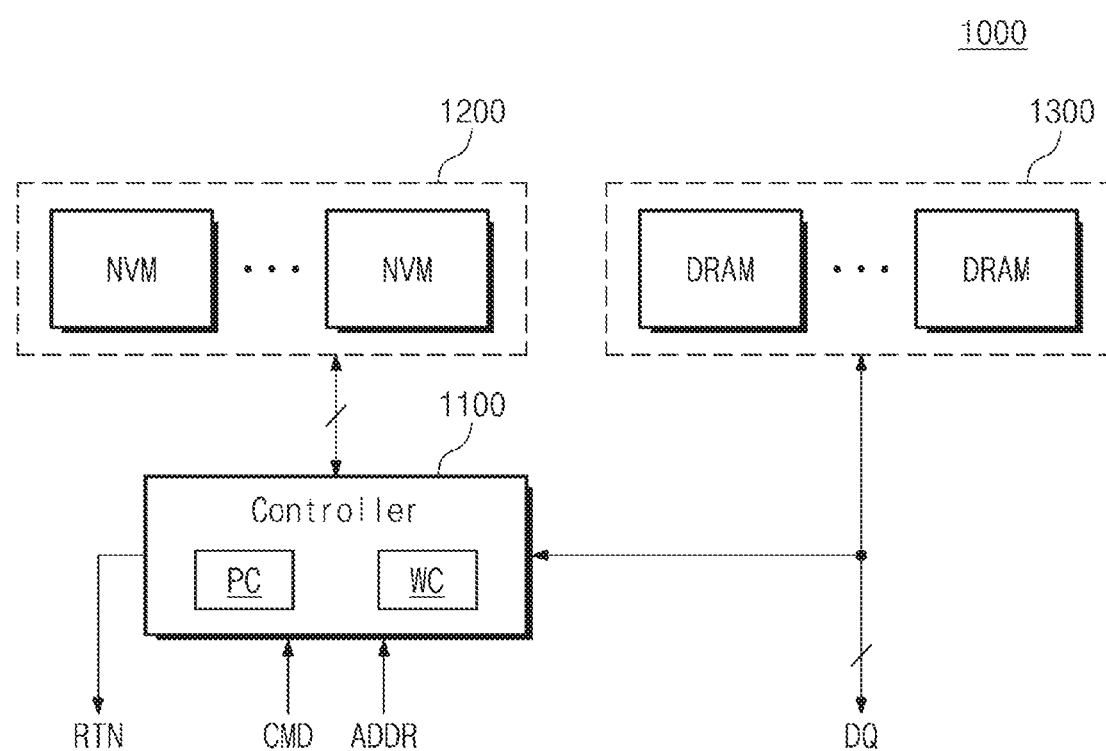
FIG. 16 is a block diagram illustrating a memory module according to some embodiments of the present inventive concept.

FIG. 16 is a block diagram illustrating a memory module according to the inventive concept. Referring to FIG. 16, a memory module 1000 may include a controller 1100, nonvolatile memory devices 1200, and DRAM devices 1300. The controller 1100 may include write credits WC and persist credits PC. The controller 1100 may write data received through a data line DQ in the nonvolatile memory device 1200 or the DRAM device 1300. For example, the memory module 1000 or the controller 1100 may communicate with an external device through a DDR interface.

For example, the controller 1100 may operate based on the method described with reference to FIGS. 1 to 15. For example, the controller 1100 may store write data received through the data line DQ in a write credit. In cases where a write credit is released, the controller 1100 may provide the WC release information RWC to the external device through the data line DQ. In some embodiments, the controller 1100 may store write data received through the data line DQ by a write credit and a persist credit; in the case where a write credit or a persist credit is released, the controller 1100 may provide the WC release information RWC or the PC release information RPC to the external device through the data line DQ.

Although not illustrated in FIG. 16, a persist credit PC may be included in a partial region of the DRAM devices 1300, and the partial region may retain data by using a separate backup power regardless of a power supply.

Figure 17:
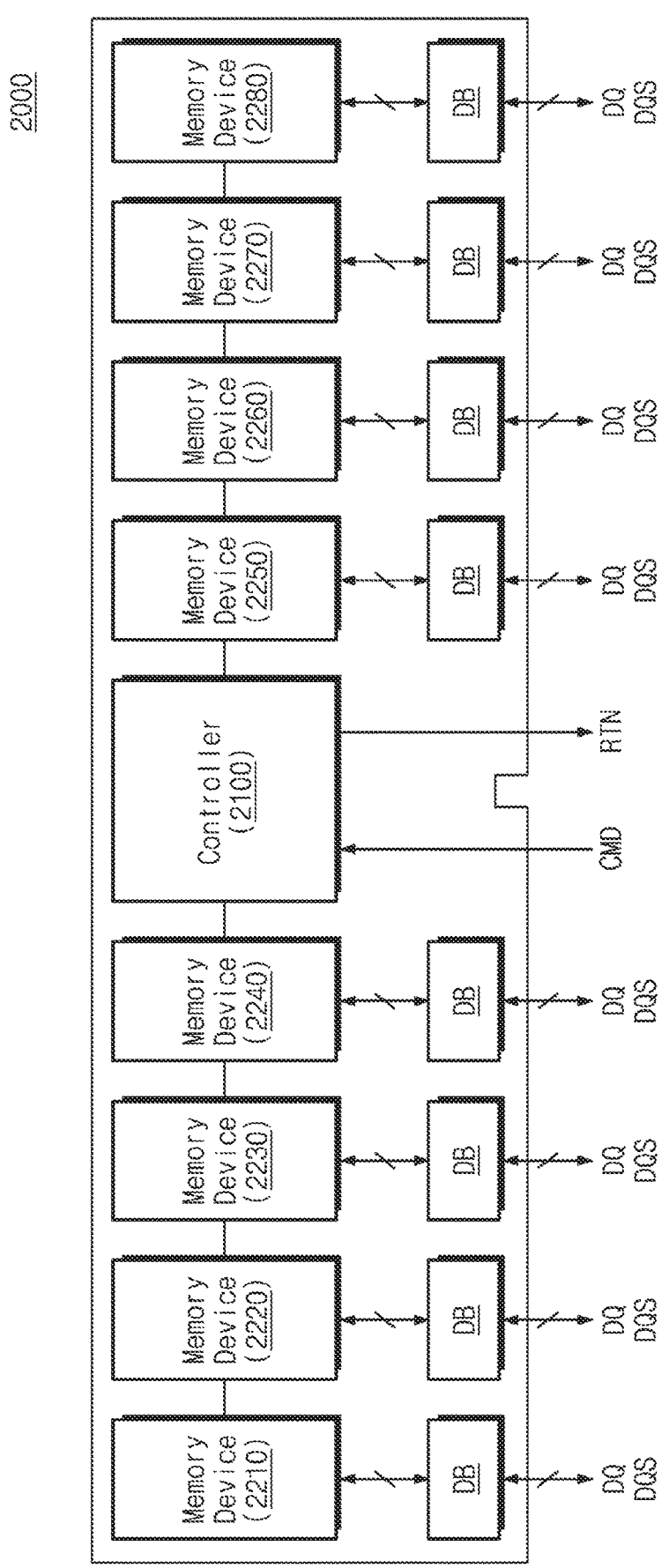
FIG. 17 is a block diagram illustrating a memory module according to some embodiments of the present inventive concept.

FIG. 17 is a block diagram illustrating a memory module according to the inventive concept. Referring to FIG. 17, a memory module 2000 may include a controller 2100, a plurality of memory devices 2210 to 2280, and a plurality of data buffers DB. For example, the memory module 2000 may communicate with an external device (e.g., a host) based on a DDR interface. For example, the controller 2100 of the memory module 2000 may be configured to control the plurality of memory devices 2210 to 2280 and the data buffers DB in response to a command CMD from the outside.

The plurality of data buffers DB may exchange data with an external device through data lines DQ and data strobe lines DQS, and may transmit the write data received from the outside to the plurality of memory devices 2210 to 2280, respectively.

A configuration of the memory module 2000 illustrated in FIG. 17 is an example according to some embodiments, and the inventive concept is not limited thereto. For example, the memory module 2000 may have an RDIMM structure in which the plurality of data buffers DB are omitted. In some embodiments, the controller 2100 may receive a plurality of data signals DQ and a plurality of data strobe signals DQS provided to the memory module 2000 and may control the plurality of memory devices 2210 to 2280 based on the received signals.

Figure 18:
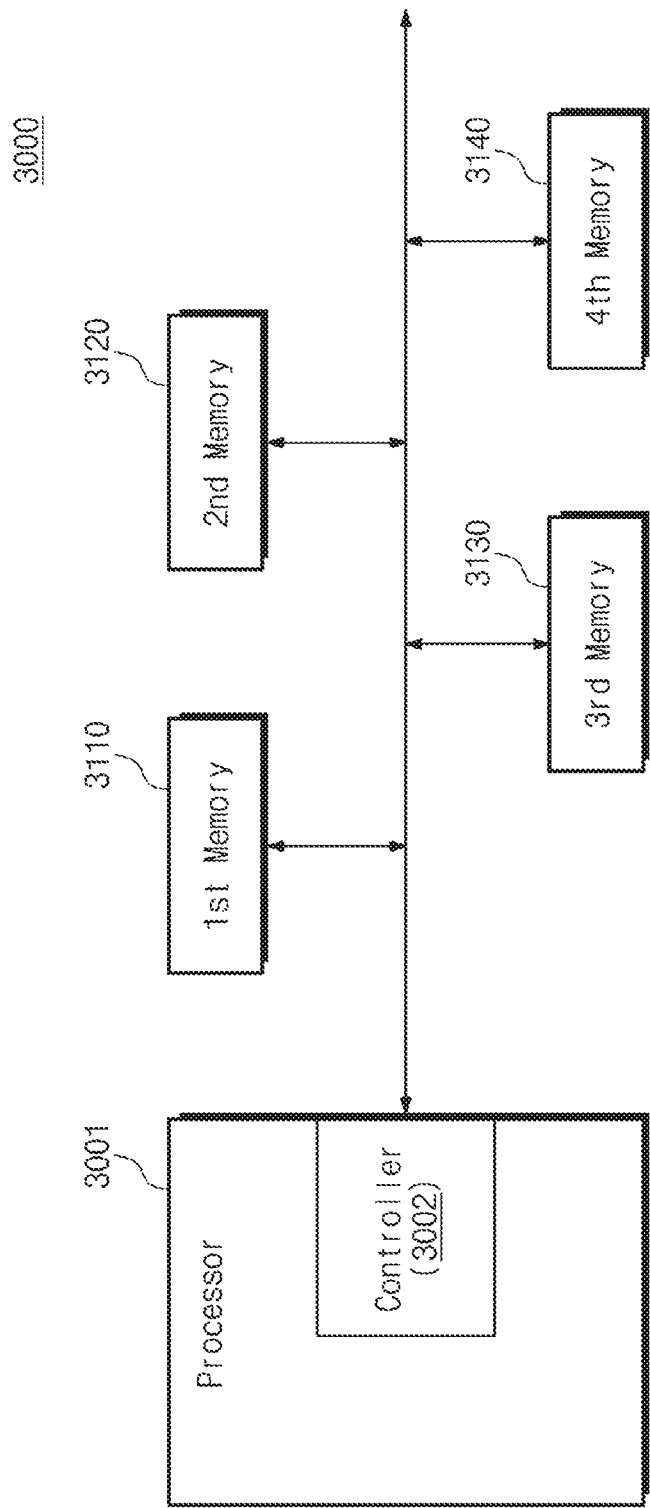
FIG. 18 is a block diagram illustrating a computing system to which a memory module according to the inventive concept is applied.

FIG. 18 is a block diagram illustrating a computing system to which a memory module according to the inventive concept is applied. Referring to FIG. 18, a computing system 3000 may include a processor 3001 and a plurality of memories 3110 to 3140.

The processor 3001 may include a controller 3002. The controller 3002 may communicate with the memories 3110 to 3140 through a bus. For example, the bus 3003 may include dedicated buses that are respectively connected with the plurality of memories 3110 to 3140 or a shared bus shared by the plurality of memories 3110 to 3140. In some embodiments, at least a part of the plurality of memories 3110 to 3140 may be a memory module described with reference to FIGS. 1 to 17 or may operate according to operation methods described with reference to FIGS. 1 to 17.

In some embodiments, at least a part of the plurality of memories 3110 to 3140 may include a nonvolatile memory, and the remaining memory modules may include a volatile memory. A memory module including a volatile memory may be used as a cache memory or a buffer memory of a memory module including a nonvolatile memory. That is, a part of the plurality of memories 3110 to 3140 may be used as a RAM device or a buffer including a persist credit PC. For example, the controller 3002 may operate based on the operation method described with reference to FIGS. 1 to 17. In some embodiments, the processor 3001 may manage write credits WC or persist credits PC based on the methods described with reference to FIGS. 1 to 17.

According to embodiments of the inventive concept, a host may manage a resource (e.g., a write credit WC and a persist credit PC) of a memory module. In the case where a resource is released, the memory module may transmit release information to a host, and the host may update the resource based on the release information. Accordingly, operation methods of a host with improved performance, operation methods of a memory module, and operation methods of a memory system are provided.

As used herein, the term "and/or" includes any and all combinations of one or more of the associated listed items. Expressions such as "at least one of," when preceding a list of elements, modify the entire list of elements and do not modify the individual elements of the list.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. An operation method of a memory module comprising a plurality of write credits, a plurality of persist credits, and a nonvolatile memory device, the operation method comprising:
  receiving persist write data from a host device;
  storing the persist write data in at least one of the plurality of write credits;
  a first moving of the persist write data from the at least one of the plurality of write credits into at least one of the plurality of persist credits;
  accumulating first release information based on the first moving;
  a second moving of the persist write data from the at least one of the plurality of persist credits into the nonvolatile memory device;
  accumulating second release information based on the second moving;
  receiving a read command from the host device;
  transmitting a data packet comprising read data corresponding to the read command, the first release information that was accumulated and the second release information that was accumulated, to the host device in response to the read command; and
  resetting the accumulated first release information and the accumulated second release information after the transmitting the data packet;
  wherein the first release information indicates a number of write credits among the plurality of write credits which have been released to be available before the first moving of the persist write data, and
  wherein the second release information indicates a number of persist credits among the plurality of persist credits which have been released to be available before the second moving of the persist write data.

2. The operation method of claim 1,
wherein each of the plurality of the write credits comprises a unit buffer in a controller of the memory module, and
wherein each of the plurality of persist credits comprises a unit storage in a RAM device of the memory module.

3. An operation method of a host device configured to communicate with a memory module including a plurality of write credits and a plurality of persist credits, the operation method comprising:
transmitting a persist write command to the memory module;
decreasing each of a first value of a write credit counter and a second value of a persist credit counter in response to the transmitting the persist write command;
transmitting a first read command to the memory module;
receiving first release information, second release information, and read data corresponding to the first read command from the memory module;
increasing the first value of the write credit counter in response to the first release information; and
increasing the second value of the persist credit counter in response to the second release information;
wherein the first value of the write credit counter indicates a number of write credits available among the plurality of write credits,
wherein the second value of the persist credit counter indicates a number of persist credits available among the plurality of persist credits,
wherein the persist write command comprises a command for a persist operation in which retaining of write data is secured at a power off,
wherein the first release information indicates a number of write credits which are released to be available by a first operation of the memory module, among the plurality of write credits,
wherein the second release information indicates a number of persist credits which are released to be available by a second operation of the memory module, among the plurality of persist credits, and
wherein the transmitting a persist write command to the memory module comprises:
comparing each of the first value of the write credit counter and the second value of the persist credit counter with a reference value;
when each of the first value of the write credit counter and the second value of the persist credit counter is equal to or greater than the reference value, transmitting the persist write command to the memory module; and
when the first value of the write credit counter and the second value of the persist credit counter are smaller than the reference value:
transmitting a return command to the memory module;
receiving third release information corresponding to the return command from the memory module; and
increasing the first value of the write credit counter or the second value of the persist credit counter in response to the third release information.

4. The operation method of claim 3,
wherein the first operation comprises moving data stored in at least one of the plurality of the write credits to at least one of the plurality of persist credits, and
wherein the second operation comprises moving data stored in the at least one of the plurality of persist credits to a nonvolatile memory device in the memory module.

5. The operation method of claim 3,
wherein the first operation comprises moving data stored in at least one of the plurality of the write credits to at least one of the plurality of persist credits, and
wherein the second operation comprises moving data stored in the at least one of the plurality of write credits to a nonvolatile memory device in the memory module.

6. The operation method of claim 3, further comprising:
transmitting a normal write command to the memory module; and
decreasing the first value of the write credit counter in response to transmitting the normal write command.

7. The operation method of claim 3,
wherein the each of the first value of the write credit counter and the second value of the persist credit counter decreases by N in response to the transmitting the persist write command, and
wherein the N is a number of unit buffers corresponding to persist write data of the persist write command.

8. The operation method of claim 7, wherein a size of each of the unit buffers is 4 KB.

9. The operation method of claim 3, wherein the reference value comprises a number of unit buffers corresponding to a number of unit buffers corresponding to persist write data of the persist write command.

10. The operation method of claim 3, further comprising:
increasing each of the first value of the write credit counter and the second value of the persist credit counter in response to the third release information.

11. The operation method of claim 3, wherein the memory module comprises a nonvolatile dual in-line memory module (NVDIMM).

12. The operation method of claim 3, wherein the first release information and the second release information are received in an asynchronous scheme.

13. An operation method of a memory system comprising a memory module and a host device, wherein the memory module comprises a plurality of write credits, a plurality of persist credits, and a nonvolatile memory device, wherein the host device comprises a write credit counter and a persist credit counter, the operation method comprising:
transmitting, by the host device, a persist write command to the memory module;
decreasing, by the host device, each of a first value of the write credit counter and a second value of the persist credit counter in response to the transmitting the persist write command;
storing, by the memory module, persist write data corresponding to the persist write command, in at least one of the plurality of write credits in response to the persist write command;
performing, by the memory module, a first operation to move the persist write data stored in the at least one of the plurality of write credits into at least one of the plurality of persist credits;
performing, by the memory module, a second operation to move the persist write data stored in the at least one of the plurality of persist credits into the nonvolatile memory device;
transmitting, by the host device, a read command to the memory module;
transmitting, by the memory module, first release information, second release information, and read data corresponding to the read command to the host device, in response to the read command;
increasing, by the host device, the first value of the write credit counter in response to the first release information; and increasing, by the host device, the second value of the persist credit counter in response to the second release information;

wherein the first release information indicates a number of write credits, which is released to be available by the first operation of the memory module, among the plurality of write credits, wherein the second release information indicates a number of persist credits, which is released to be available by the second operation of the memory module, among the plurality of persist credits, and wherein transmitting, by the host device, a persist write command to the memory module comprises:

comparing, by the host device, each of the first value of the write credit counter and the second value of the persist credit counter with a reference value;

when each of the first value of the write credit counter and the second value of the persist credit counter is equal to or greater than the reference value, transmitting, by the host device, the persist write command to the memory module; and when the first value of the write credit counter and the second value of the persist credit counter are smaller than the reference value:

transmitting, by the host device, a return command to the memory module;

transmitting, by the memory module, third release information to the host device in response to the return command; and increasing, by the host device, the first value of the write credit counter or the second value of the persist credit counter in response to the third release information.

14. The operation method of claim 13, further comprising:

moving, by the memory module, the persist write data stored in the at least one of the plurality of write credits into the nonvolatile memory device;

transmitting, by the memory module, the third release information in response to the moving the persist write data from the at least one of the plurality of write credits into the nonvolatile memory device; and increasing, by the host device, each of the first value of the write credit counter and the second value of the persist credit counter in response to the third release information.

* * * * *